(12) United States Patent
Fan

(10) Patent No.: US 10,379,386 B2
(45) Date of Patent: *Aug. 13, 2019

(54) NOISE CANCELLING MICROPHONE APPARATUS

(71) Applicant: KOPIN CORPORATION, Westborough, MA (US)

(72) Inventor: Dashen Fan, Bellevue, WA (US)

(73) Assignee: Kopin Corporation, Westborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/726,620

(22) Filed: Oct. 6, 2017

(65) Prior Publication Data

US 2018/0045982 A1 Feb. 15, 2018

Related U.S. Application Data

(63) Continuation of application No. 14/181,059, filed on Feb. 14, 2014, now Pat. No. 9,810,925.

(Continued)

(51) Int. Cl.
*G10L 21/0208* (2013.01)
*G10L 21/0216* (2013.01)
(Continued)

(52) U.S. Cl.
CPC .......... *G02C 11/10* (2013.01); *G10K 11/002* (2013.01); *H04R 1/028* (2013.01); *H04R 3/005* (2013.01);
(Continued)

(58) Field of Classification Search
CPC ....... G10L 21/0208; G10L 2021/02165; G10L 25/78; G10L 2021/02166; G10L 21/0272;
(Continued)

(56) References Cited

U.S. PATENT DOCUMENTS 3,378,649 A 4/1968 Mawby
3,789,163 A 1/1974 Dunlavy
(Continued)

FOREIGN PATENT DOCUMENTS

CN 1479525 A 3/2004
CN 101682809 A 3/2010
(Continued)

OTHER PUBLICATIONS

DAEnotes: Pre-emphasis and De-emphasis, Jan. 30, 2012 (retrieved Aug. 6, 2018).*

(Continued)

*Primary Examiner* — Dwayne D Bost
*Assistant Examiner* — Stephen M Brinich
(74) *Attorney, Agent, or Firm* — Hamilton, Brook, Smith & Reynolds, P.C.

(57) ABSTRACT

Example embodiments include a method of reducing noise include forming a main signal and one or more reference signals at a beam-former based on at least two received audio signals, detecting voice activity at a voice activity detector, where the voice activity detector receives the main and reference signals and outputting a desired voice activity signal, adaptively cancelling noise at an adaptive noise canceller, where the adaptive noise canceller receives the main, reference, and desired voice activity signals and outputs an adaptive noise cancellation signal, and reducing noise at a noise reducer receiving the desired voice activity and adaptive noise cancellation signals and outputting a desired speech signal.

8 Claims, 21 Drawing Sheets

Related U.S. Application Data

(60) Provisional application No. 61/912,844, filed on Dec. 6, 2013, provisional application No. 61/839,227, filed on Jun. 25, 2013, provisional application No. 61/839,211, filed on Jun. 25, 2013, provisional application No. 61/780,108, filed on Mar. 13, 2013.

(51) Int. Cl.
| | |
|---|---|
| *G02C 11/00* | (2006.01) |
| *H04R 1/02* | (2006.01) |
| *H04R 3/00* | (2006.01) |
| *G10K 11/00* | (2006.01) |
| *G02C 11/06* | (2006.01) |

(52) U.S. Cl.
CPC .......... *G02C 11/06* (2013.01); *G10L 21/0208* (2013.01); *G10L 2021/02166* (2013.01); *Y10T 29/49826* (2015.01)

(58) Field of Classification Search
CPC .......... G10L 19/10; G10L 2021/02161; G10L 19/02; G10L 2021/02168; G10L 21/0232; G10L 15/20; G10L 2025/786; G10L 25/93; G10L 2021/02082; G10L 2025/783; G10L 21/0364; G10L 15/00
USPC ............... 704/226–228, 233–234, E15.039, 704/E21.004
See application file for complete search history.

(56) References Cited

U.S. PATENT DOCUMENTS

| | | | |
|---|---|---|---|
| 3,946,168 | A | 3/1976 | Preves |
| 4,773,095 | A | 9/1988 | Zwicker et al. |
| 4,904,078 | A | 2/1990 | Gorike |
| 4,966,252 | A | 10/1990 | Drever |
| 6,091,546 | A | 7/2000 | Spitzer |
| 6,325,507 | B1 | 12/2001 | Jannard et al. |
| 6,349,001 | B1 | 2/2002 | Spitzer |
| 6,996,647 | B2 | 2/2006 | Raghavan et al. |
| 7,082,393 | B2 | 7/2006 | Lahr |
| 7,004,582 | B2 | 12/2006 | Jannard et al. |
| 7,147,324 | B2 | 12/2006 | Jannard et al. |
| 7,150,526 | B2 | 12/2006 | Jannard et al. |
| 7,174,022 | B1 | 2/2007 | Zhang et al. |
| 7,213,917 | B2 | 5/2007 | Jannard et al. |
| 7,216,973 | B2 | 5/2007 | Jannard et al. |
| 7,219,994 | B2 | 5/2007 | Jannard et al. |
| 7,278,734 | B2 | 10/2007 | Jannard et al. |
| 7,359,504 | B1 | 4/2008 | Reuss et al. |
| 7,386,135 | B2 | 6/2008 | Fan |
| 7,445,332 | B2 | 11/2008 | Jannard et al. |
| 7,452,073 | B2 | 11/2008 | Jannard et al. |
| 7,461,936 | B2 | 12/2008 | Jannard |
| 7,494,216 | B2 | 2/2009 | Jannard et al. |
| 7,512,414 | B2 | 3/2009 | Jannard et al. |
| 7,682,018 | B2 | 3/2010 | Jannard |
| 7,744,213 | B2 | 6/2010 | Jannard et al. |
| 7,753,520 | B2 | 7/2010 | Fuziak, Jr. |
| 7,798,638 | B2 | 9/2010 | Fuziak, Jr. |
| 7,918,556 | B2 | 4/2011 | Lewis |
| 7,929,714 | B2 | 4/2011 | Bazarjani et al. |
| 7,959,084 | B2 | 6/2011 | Wulff |
| 7,976,480 | B2 | 7/2011 | Grajales et al. |
| 7,988,283 | B2 | 8/2011 | Jannard |
| 7,966,189 | B2 | 9/2011 | Le et al. |
| 8,020,989 | B2 | 9/2011 | Jannard et al. |
| 8,184,983 | B1 | 5/2012 | Ho et al. |
| 8,543,061 | B2 | 9/2013 | Suhami |
| 8,744,113 | B1 | 6/2014 | Rickards |
| 9,753,311 | B2 | 9/2017 | Fan |
| 9,810,925 | B2 * | 11/2017 | Fan .................. G02C 11/10 |
| 2002/0015008 | A1 | 2/2002 | Kishida et al. |
| 2003/0068057 | A1 | 4/2003 | Miller et al. |
| 2004/0001137 | A1 | 1/2004 | Cutler |
| 2005/0069156 | A1 | 3/2005 | Haapapuro et al. |
| 2005/0248717 | A1 | 11/2005 | Howell et al. |
| 2005/0264527 | A1 | 12/2005 | Lin |
| 2006/0132382 | A1 | 6/2006 | Jannard |
| 2006/0285714 | A1 | 12/2006 | Akino |
| 2007/0160254 | A1 | 7/2007 | Ritter et al. |
| 2007/0195968 | A1 | 8/2007 | Jaber |
| 2008/0175408 | A1 | 7/2008 | Mukund et al. |
| 2008/0260189 | A1 | 10/2008 | Schobben |
| 2008/0317259 | A1 | 12/2008 | Zhang et al. |
| 2008/0317260 | A1 | 12/2008 | Short |
| 2009/0154719 | A1 | 6/2009 | Wulff et al. |
| 2010/0020229 | A1 | 1/2010 | Hershey et al. |
| 2010/0208928 | A1 | 8/2010 | Chene et al. |
| 2011/0001699 | A1 | 1/2011 | Jacobsen et al. |
| 2011/0091057 | A1 | 4/2011 | Derkx |
| 2011/0214082 | A1 | 9/2011 | Osterhout et al. |
| 2011/0221669 | A1 | 9/2011 | Shams et al. |
| 2011/0221671 | A1 | 9/2011 | King, III et al. |
| 2011/0227812 | A1 | 9/2011 | Haddick et al. |
| 2011/0227813 | A1 | 9/2011 | Haddick et al. |
| 2011/0255050 | A1 | 10/2011 | Jannard et al. |
| 2012/0056846 | A1 | 3/2012 | Zaliva |
| 2012/0062445 | A1 | 3/2012 | Haddick et al. |
| 2012/0075168 | A1 | 3/2012 | Osterhout et al. |
| 2012/0105740 | A1 | 5/2012 | Jannard et al. |
| 2012/0162259 | A1 | 6/2012 | Sakai |
| 2012/0282976 | A1 | 11/2012 | Suhami |
| 2013/0314280 | A1 | 11/2013 | Maltsev et al. |
| 2014/0268016 | A1 | 9/2014 | Chow et al. |
| 2014/0270244 | A1 | 9/2014 | Fan |
| 2014/0270316 | A1 | 9/2014 | Fan |
| 2014/0278385 | A1 | 9/2014 | Fan |

FOREIGN PATENT DOCUMENTS

| | | |
|---|---|---|
| CN | 202 102 188 | 1/2012 |
| CN | 102893331 A | 1/2013 |
| CN | 105229737 A | 1/2016 |
| EP | 2 323 422 A1 | 5/2011 |
| EP | 2 469 323 A1 | 6/2012 |
| EP | 2973556 | 7/2018 |
| JP | 9252340 | 9/1997 |
| JP | 2008187749 | 5/2008 |
| JP | 2014502471 | 1/2014 |
| JP | 6375362 | 7/2018 |
| TW | 201006265 A | 1/2010 |
| TW | I624709 | 5/2018 |
| WO | WO 2000/02419 | 1/2000 |
| WO | WO 2009/076016 | 6/2009 |
| WO | WO 2011/087770 A2 | 7/2011 |
| WO | 2012026126 | 3/2012 |
| WO | WO 2012/040386 | 3/2012 |
| WO | WO 2012051669 A1 | 4/2012 |
| WO | WO 2012/097014 A1 | 7/2012 |
| WO | WO 2014/158426 A1 | 10/2014 |
| WO | WO 2014/163794 A2 | 10/2014 |
| WO | WO 2014/163796 A1 | 10/2014 |
| WO | WO 2014/163797 A1 | 10/2014 |

OTHER PUBLICATIONS

International Search Report and Written Opinion, PCT/US2014/016570, "Noise Cancelling Microphone Apparatus," dated Jun. 25, 2014.

Zhang, X., et al., "Noise Estimation Based on an Adaptive Smoothing Factor for Improving Speech Quality in a Dual-Microphone Noise Suppression System," Signal Processing and Communication Systems (ICSPCS), 5th International Conference, Dec. 12, 2011, pp. 1-5.

International Search Report and Written Opinion, PCT/US2014/016558, Entitled, "Eye Glasses with Microphone Array," dated Jun. 25, 2014.

Office Action from U.S. Appl. No. 14/180,986, entitled "Sound Induction Ear Speaker for Eye Glasses," dated Nov. 21, 2014.

International Search Report and Written Opinion from PCT/US2014/

(56) References Cited

OTHER PUBLICATIONS 016557, entitled "Sound Induction Ear Speaker for Eye Glasses" dated Sep. 24, 2014.
International Search Report and Written Opinion for Int'l Application No. PCT/US2014/016547, titled: Sound Induction Ear Speaker for Eye Glasses; dated Apr. 29, 2015.
Office Action for U.S. Appl. No. 14/180,986 entitled "Sound Induction Ear Speaker for Eye Glasses," dated Jul. 16, 2015.
International Preliminary Report on Patentability for Int'l Application No. PCT/US2014/016547, titled: Sound Induction Ear Speaker for Eye Glasses; dated Sep. 15, 2015.
International Preliminary Report on Patentability for Int'l Application No. PCT/US2014/016557, titled: Sound Induction Ear Spectacle With Audio Speaker in the Temple; dated Sep. 15, 2015.
International Preliminary Report on Patentability for Int'l Application No. PCT/US2014/016558, titled: Eye Glasses With Microphone Array; dated Sep. 15, 2015.
International Preliminary Report on Patentability for Int'l Application No. PCT/US2014/016570, titled: Noise Cancelling Microphone Apparatus; dated Sep. 15, 2015.
Office Action dated Oct. 23, 2015 for U.S. Appl. No. 14/180,994, entitled "Eye Glasses With Microphone Array."
Office Action for U.S. Appl. No. 14/181,087, entitled Eyewear Spectacle With Audio Speaker in the Temple ,: dated Jan. 6, 2016.
Final Office Action for U.S. Appl. No. 14/180,994 entitled "Eye Glasses With Microphone Array", dated Jun. 30, 2016.
Non-Final Office Action for U.S. Appl. No. 14/180,994 entitled "Eye Glasses With Microphone Array", dated Dec. 14, 2016.
Notice of Allowance dated May 4, 2017 for U.S. Appl. No. 14/180,994, entitled "Eye Glasses with Microphone Array".
Non-Final Office Action for U.S. Appl. No. 14/181,059 entitled "Noise Cancelling Microphone Apparatus," dated Feb. 16, 2016.
Final Office Action for U.S. Appl. No. 14/181,059 entitled "Noise Cancelling Microphone Apparatus," dated Aug. 16, 2016.
Non-Final Office Action for U.S. Appl. No. 14/181,059 entitled "Noise Cancelling Microphone Apparatus," dated Dec. 13, 2016.
Notice of Allowance for U.S. Appl. No. 14/181,059 entitled "Noise Cancelling Microphone Apparatus," dated Jul. 10, 2017.
Search Report for Chinese Application No. 201480022740.3, filed Feb. 14, 2014, entitled, "Noise Cancelling Microphone Apparatus," dated Jul. 26, 2018.

* cited by examiner

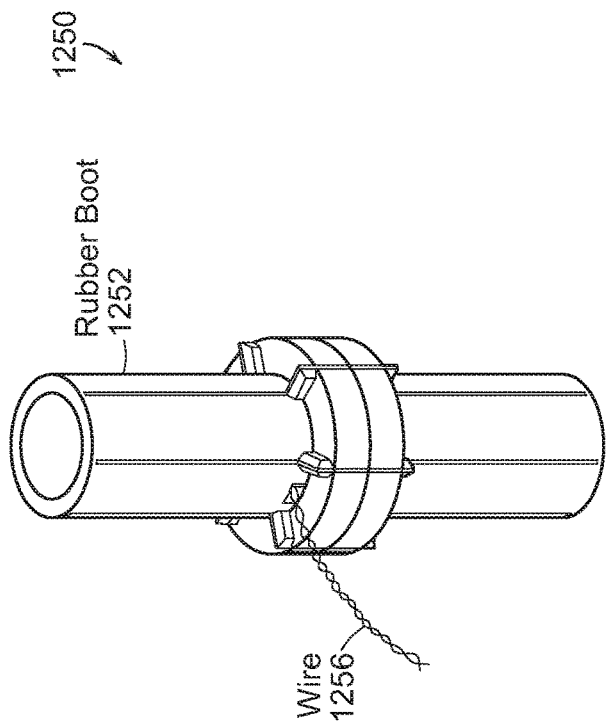
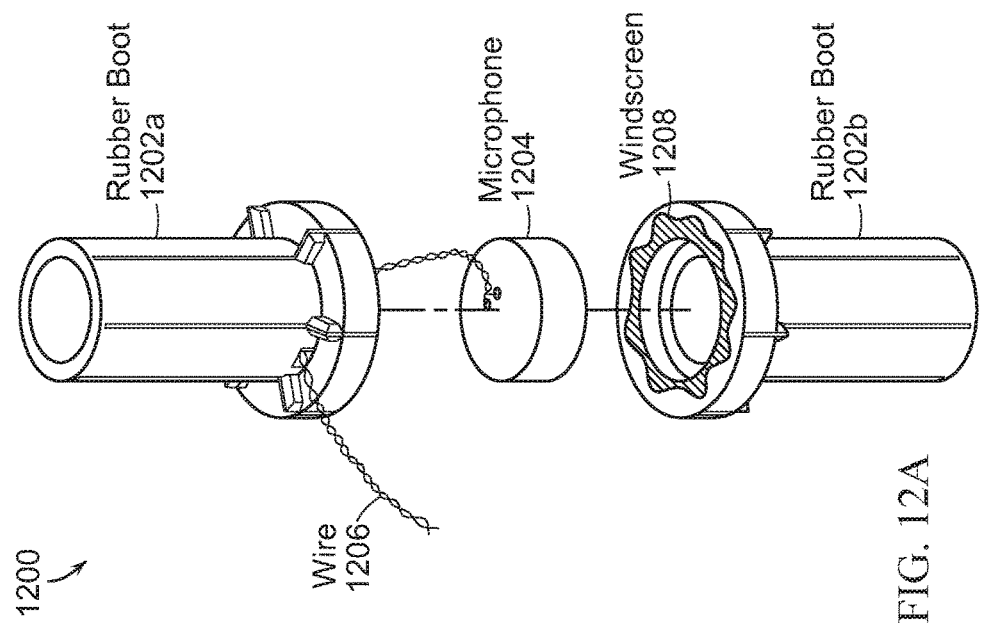
FIG. 12B
FIG. 12A

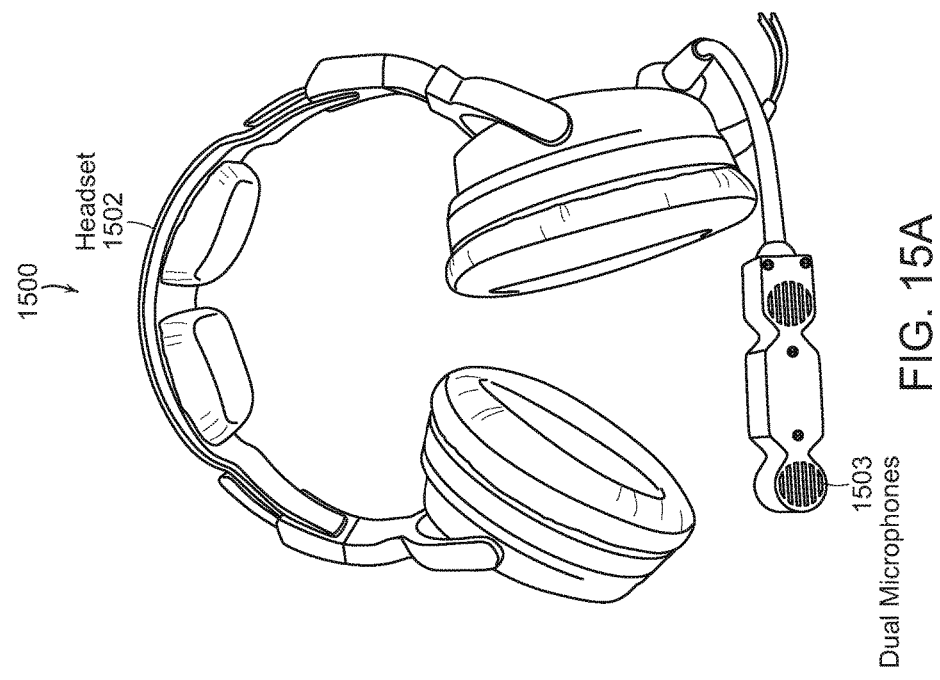
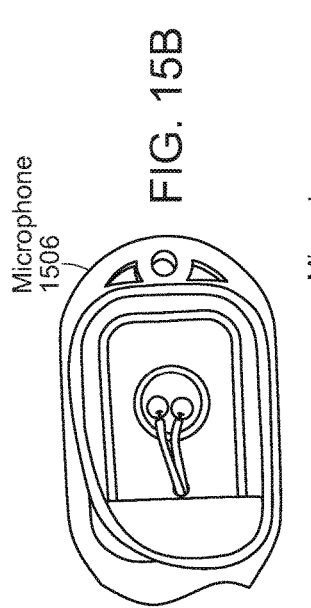
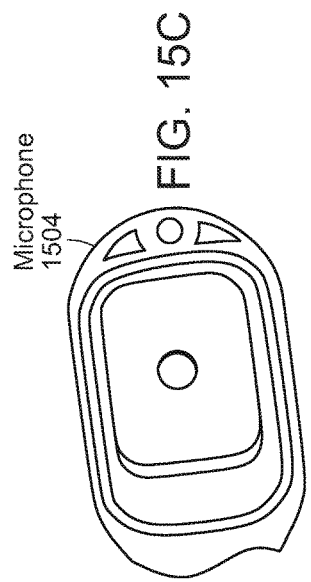
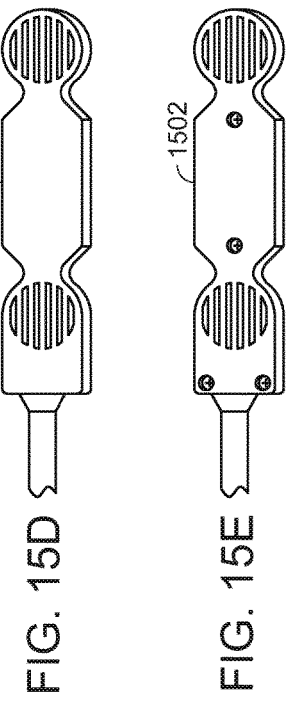

NOISE CANCELLING MICROPHONE APPARATUS

RELATED APPLICATIONS

This application is a continuation of U.S. application Ser. No. 14/181,059, filed Feb. 14, 2014, which claims the benefit of U.S. Provisional Application No. 61/780,108, filed on Mar. 13, 2013. U.S. application Ser. No. 14/181,059 also claims the benefit of U.S. Provisional Application No. 61/839,211, filed on Jun. 25, 2013. U.S. application Ser. No. 14/181,059 also claims the benefit of U.S. Provisional Application No. 61/839,227, filed on Jun. 25, 2013. U.S. application Ser. No. 14/181,059 also claims the benefit of U.S. Provisional Application No. 61/912,844, filed on Dec. 6, 2013.

U.S. application Ser. No. 14/181,059 was co-filed on the same day, Feb. 14, 2014, with "Eye Glasses With Microphone Array" by Dashen Fan, U.S. application Ser. No. 14/180,994. U.S. application Ser. No. 14/181,059 was co-filed on the same day, Feb. 14, 2014, with "Sound Induction Ear Speaker For Eye Glasses" by Dashen Fan, U.S. application Ser. No. 14/180,986. U.S. application Ser. No. 14/181,059 was co-filed on the same day, Feb. 14, 2014, with "Eyewear Spectacle With Audio Speaker In The Temple" by Kenny Chow et al., U.S. application Ser. No. 14/181,037.

The entire teachings of the above applications are incorporated herein by reference.

BACKGROUND OF THE INVENTION

In many computer and electronic systems that record sound, it is desirable to reduce background noise. Reducing background noise can provide advantages to the user such as outputting a clearer audio signal. Reducing background noise can also provide advantages to processes such as automatic speech recognition.

The acoustic characteristics of a noise canceling close-talk microphone are often very useful. Such microphones (also referred to herein as "mics") often have a long boom form factor, which positions the microphone in front of the user's mouth. However, such a form factor has drawbacks, including deteriorated performance due to ongoing moisture from the user's mouth accumulating on the surface of the microphone membrane (ECM microphone) and a form-factor considered inconvenient and annoying by most users.

Therefore, there is a need for a noise cancelling microphone apparatus and method of its use that overcomes or minimizes the above-referenced problems.

SUMMARY OF THE INVENTION

More specifically, some embodiments include shortening the boom, moving the microphone away from the user's mouth, using acoustic housings such as polymeric or rubber extensions or boots to extend the acoustic ports of the microphones, therefore extending the effective close talk range while maintaining the noise canceling property for faraway noises.

Example embodiments of the present invention include a short boom headset, such as an audio headset for telephony suitable for enterprise call centers, industrial, and general mobile usage, an in-line "ear buds" headset with an input line (wire, cable, or other connector), mounted on or within the frame of eyeglasses, a near-to-eye (NTE) headset display or headset computing device, a long boom headset for very noisy environments, such as industry, military, and aviation applications, and a gooseneck desktop-style microphone, which can be used to provide theater or symphony-hall type quality acoustics without the structural costs.

Example embodiments as well as further details and benefits of the present invention are presented in more detail following the claims. Features of the invention presented herein which are couple may be physically and/or communicatively coupled (e.g., using wired connections or wirelessly).

Example embodiments include a method of reducing noise include forming a main signal and one or more reference signals at a beam-former based on at least two received audio signals, detecting voice activity at a voice activity detector, where the voice activity detector receives the main and reference signals and outputting a desired voice activity signal, adaptively cancelling noise at an adaptive noise canceller, where the adaptive noise canceller receives the main, reference, and desired voice activity signals and outputs an adaptive noise cancellation signal, and reducing noise at a noise reducer receiving the desired voice activity and adaptive noise cancellation signals and outputting a desired speech signal.

A further example embodiment of the present invention can include a noise canceling digital signal processor (DSP), including a beam-former configured or communicatively coupled to receive at least two audio signals and output a main signal and one or more reference signals based on the at least two audio signals, a voice activity detector configured or communicatively coupled to receive the main and reference signals and output or produce a desired voice activity signal, and adaptive noise canceller configured or communicatively coupled to receive the main, reference, and desired voice activity signals and to output or produce an adaptive noise cancellation signal, and a noise reducer configured or communicatively coupled to receive the desired voice activity and adaptive noise cancellation signals and output or produce a desired speech signal.

Still further example embodiments of the present invention can include a desired voice activity signal configured or communicatively coupled to control the adaptive noise canceller and the noise reducer. The voice activity detector can further include one or more short-time detectors, communicatively coupled to or configured to detect a short-time power of each of the received main and reference signals, respectively, one or more log scalers or amplifiers, communicatively coupled to or configured to convert the short time power detections (to a logarithmic scale (e.g., in dB) of each short-time detector, respectively, and one or more combiners, communicatively coupled or configured to receive the amplified short-time power detections of the main signal and one of the reference signals and produce or output a voice activity difference signal (e.g., in dB) based on the difference between the main and reference signal detections. The short-time detectors may be coupled to receive a reference or main signal as an input and output the detected short-time power to a series amplifier. The short time detectors and amplifiers can be in series for each respective signal. The amplifiers can be logarithmic converters (also referred to as log amplifiers or log scalers). The combiners can combine adjacent signals, such as the main signal and one of the at least one reference signals, to produce a voice activity difference signal by subtracting the detection(s) of the reference signal from the main signal (or vice-versa).

In still further example embodiments, the voice activity difference signal can be communicatively coupled to a single signal channel voice activity detector, which outputs the desired voice activity signal. The voice activity detector can further include one or more OR-gates or AND-gates, the selection of OR-gates or AND-gates based on microphone configuration, arranged to receive multiple desired voice activity signals and output one of the multiple desired voice activity signals based on the OR gate truth (or logic) table. The multiple desired voice activity signals can also be final consolidated desired voice activity signals. The short-time detector may be a root-mean-square (RMS) detector, a power detector, energy detector or similar.

In yet further example embodiments, the beam-former can include one or more low-pass filters (LPFs) (e.g., de-emphasis filters). The LPFs can be arranged to filter each of the main and reference signals prior to reception by the voice activity detector. A unitary multi-signal LPF can be used or individual LPFs for each signal can be used. The LPFs can have the same frequency response or transfer function characteristics. Alternatively, LPFs may have different frequencies responses and transfer function characteristics for each signal. The LPFs can have a gradual roll-off slope, starting from a frequency between approximately 1 kHz and 4 kHz and continuing to the Nyquist frequency. The beam-former can also include a frequency response matching filter arranged to filter the reference and/or main signals. The frequency response matching filters can be used to adjust the gain, phase, and/or shaping the frequency response of the signal. The frequency response matching filters can be used to match the frequency response of the reference and/or main signals.

In a yet further example embodiment, a bi-directional pressure-gradient microphone elements can provide or output the at least two audio signals to the VAD module and the channel noise reduction module. The bi-directional pressure-gradient microphone element can have two acoustic ports. The pressure-gradient microphone element can be sealed within an acoustic housing or acoustic extension or rubber boot such as polymeric or rubber extensions or boots. The term "seal" or "sealed" as used herein generally refers to an air-tight or hermetic seal. The acoustic extension can include an acoustic duct for each acoustic port. The acoustic ducts can extend the range of each acoustic port. Thus, near-field talk range of the microphone can be increased. The pressure gradient microphone element, or with the acoustic housing, can be further mounted airtight within a tube. The tube can be cylindrical, square, or any other shape. The tube can include at least a pair of acoustic openings and wind-screen material. The acoustic openings can be located longitudinally along the tube at distances spaced equal to or greater than the range of each acoustic port. The wind-screen material can be a foam or wind-guard material and can be used to fill the interior of the tube, between the acoustic extension and tube ends. The cylindrical tube can be a short boom coupled to a headset device.

In still further example embodiments, an array of microphones can generate the at least two audio signals. The at least two audio signals can be received at a beam-former. The audio signals can be digitized. The array of microphones can include at least two pressure gradient microphone elements, each pressure gradient microphone element having two acoustic ports. The acoustic ports can be the entry points (inputs) for sound waves. The two pressure gradient microphone elements can be bidirectional and identical. The two pressure gradient microphone elements can be further sealed within an acoustic housing, acoustic extension or airtight rubber boot. The acoustic housing, extension or rubber boot can include an acoustic duct for each acoustic port. The acoustic ducts can extend the range of each acoustic port. Thus, the near-field talk range of the microphones can be increased. The pressure gradient microphone elements can further be mounted airtight in series within a substantially cylindrical tube. The cylindrical tube can include at least three acoustic openings and wind-screen material or foam filling material. The acoustic openings can be located longitudinally along the tube at equally spaced distances greater than the range of each acoustic duct, or at a range at least equal to the range of each acoustic duct. The wind-screen or foam filling material can be used to fill the interior tube space between the acoustic openings and the acoustic ports, thus blocking wind and wind noise. The wind-screen can be a foam material or other material (e.g., wind guard sleeves over the rubber boots). The cylindrical tube can be a short boom coupled to a headset device. The cylindrical to can also be coupled to a goose neck desktop microphone device.

In still further embodiments, two omni-directional mics and additional beam-forming can be substituted for a pressure gradient microphone with acoustic extension. For example, each pressure gradient microphone element can be replaced by two omni-directional microphone elements where one omni-directional microphone element is located approximately at the position of each acoustic port (at the end of each acoustic extension duct). The output or output audio signal produced by the two omni-directional microphone elements can be received by the beam-former and processed to produce a beam pattern equivalent to the pressure-gradient microphone beam pattern. The beam-former can be an analog beam-former or a digital beam-former (that electronically forms beams). A bi-directional microphone with acoustic port extensions can be replaced by two omni-directional microphones, each being located approximately at the position of an acoustic port at the end of an acoustic extension duct and additional beam-former circuitry.

In still further example embodiments, the array of microphones can be coupled to a long boom headset device. Such a long boom headset can appear to be a conventional close-talk mic; however, it is a big boom mic with two mics in parallel. The end of the microphone boom can be arranged for positioning in front of the user's mouth while remaining microphone elements are arranged for positioning at the side(s) of the user's mouth. The end of the microphone therefore remains a short distance from the user's mouth. Such a close talk long boom design can be used in very heavy noise environments, including military, aviation, and industrial environments. Such a device can provide useful noise cancellation performance. The array of mics can include two pressure gradient noise cancellation microphones, wherein one of the microphones is positioned directly in front of the mouth of the user, while the other microphone is located at the side of the user's mouth. The two mics can be identical in a single housing (casing) or identical housings. The microphone patterns can be directionally parallel to each other and perpendicular to the boom. Each mic within the housing might can have a front and back opening. The digital signal processing circuitry can be located within the housing between the mics. The array can include bi-directional microphones replacing the pressure gradient noise cancellation microphones. The array can include omni-directional microphones as well. The array can include two to four microphones.

In still further example embodiments, the array of microphones can be located in-line with a headphone feed connector. The headphone feed connector can be a pair of ear-buds, such as the type that are typically used with a cell phone for hands-free calling, or other similar audio headset device. Microphones of the array of microphones can be pressure gradient microphones or omni-directional microphones or some other microphone type. Such an array of microphones can be located along the connector (e.g., wire, cable, etc.) at various points, such as close to the user's mouth or in proximity of the Y split, above, at or below the split (the "Y" split is where the left and right ear bud cords split from the input cord connector).

In still further example embodiments, the array of microphones can be located within or mounted on the housing of an eyeglasses frame. A first microphone can be located near the bridge support (the bridge support separates the lenses of the classes and typically sits on or above the user's nose). The first microphone can have top and bottom acoustic ports. A second microphone can be located near an end-point of the glasses frames (near a user's temple, between the lens and a support arm). The second microphone can have top and bottom acoustic ports. A yet further example embodiment can include a third microphone, located at the opposite end-point of the glasses from the second mic and have top and bottom acoustic ports.

The array of microphones, in a still further embodiment, can include three or more omni-directional microphone elements. The beam-former can be further configured to receive an audio signal for each respective microphone element. Thus, there are three or more audio signals input to the beam-former. The beam-former can include splitters, combiners, amplifiers, and phase shifters. The amplifiers and phase shifters can be located in series along branches or signals of the beam-forming network, where the splitters and combiners are used to form branches or signals of the beam-forming network originating from the microphone elements. The beam-former can be further arranged such that adjacent audio signals are combined to produce two or more audio difference signals. The two or more audio difference signals can have equivalent phase lengths.

In general, alternate embodiments can be realized by replacing each bi-directional microphone element with two omni-directional microphone elements electrically coupled together using a beam-former. Such substitution can achieve an identical beam pattern. In certain embodiments, two bi-directional microphone elements with two omni-directional elements, alternative embodiments can result by combining the eliminating one of the two middle positional microphone elements, such that three microphone elements in series, and adjusting the beam-forming accordingly. In the three microphone element example the middle microphone element is used with beam-forming to produce equivalent beam patterns of both the first bi-directional microphone beam pattern, forming the main signal, and the second bi-directional microphone beam pattern, forming the reference signal.

Example embodiments of the digital signal processor (DSP) can be implemented using a system on a chip (SOC), a Bluetooth chip, a DSP chip, or codec with the DSP integrated circuits (ICs).

In a still further example process for reducing noise can be executed on a non-transitory computer program product, including a computer readable medium having computer readable instructions stored thereon. The computer readable instructions when loaded and executed by a processor can cause the processor to form beams based on at least two audio signal inputs and produce a main signal and one or more reference signals, detect voice activity based on the main and reference signals and produce a desired voice activity signal, adaptively cancel noise based on the main, reference, and desired voice activity signals and produce an adaptive noise cancellation signal, and reduce noise based on the desired voice activity and adaptive noise cancellation signals and output a desired speech signal.

Further example embodiments of the present invention may be configured using a computer program product; for example, controls may be programmed in software for implementing example embodiments of the present invention. Further example embodiments of the present invention may include a non-transitory computer readable medium containing instruction that may be executed by a processor, and, when executed, cause the processor to complete methods described herein. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read only memory (CD-ROM), "Flash" memory and so forth. In operation, a general purpose or application specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

In another embodiment, a handheld device for recording audio includes a top portion and a bottom portion. A first of the array of microphones is housed in the top portion and a second of the array of microphones is in the bottom portion. The top portion can also house at least two microphones and the bottom portion can house at least two microphones.

In an embodiment, a noise cancelling microphone further includes a headset, and a short boom housing the noise cancelling microphone. The short boom can also house two noise cancelling microphones.

The noise cancelling microphone can also include at least one earphone, the earphone housing the noise cancelling microphone. The noise cancelling microphone can also include eye-glasses configured to house at least one microphone.

The noise cancelling microphone can also include a headset, the headset configured to house a close-talk dual-microphone long boom.

The noise cancelling microphone can also include a gooseneck podium configured to house at least two microphone elements.

This invention has many advantages. For example, the audio device of the invention, by virtue of the microphone array, improves accurate recognition of speech by minimizing unwanted noise, particularly in those embodiments that employ a digital signal processor that actively cancels unwanted noise, thereby decreasing arrays in such speech recognition. Further, the present invention integrates the microphone array and digital signal processor in a convenient and comfortable format for everyday use.

BRIEF DESCRIPTION OF THE DRAWINGS

FIGS. 12A-B are diagrams illustrating an example embodiment of a rubber boot and microphone assembly of the invention.

FIGS. 15A-15E are diagrams of headsets having a dual-microphone attached.

DETAILED DESCRIPTION OF THE INVENTION

Figure 1:
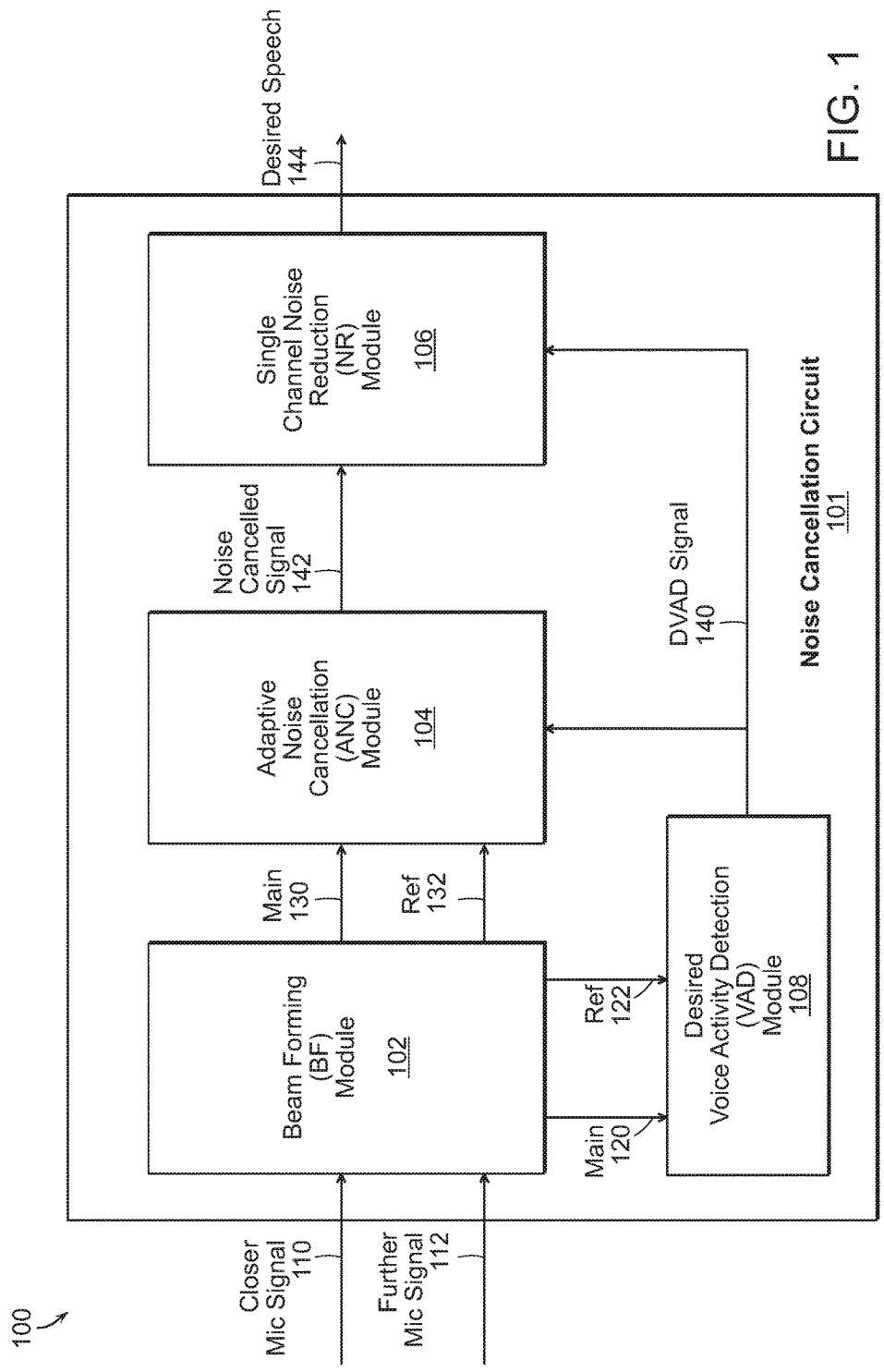
FIG. 1 is a block diagram illustrating an example embodiment of a noise cancellation circuit of the present invention.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

In a head mounted computer, a user can desire a noise-canceling close-talk microphone without a boom microphone in front of his or her mouth. The microphone in front of the user's mouth can be viewed as annoying. In addition, moisture from the user's mouth can condense on the surface of the Electret Condenser Microphone (ECM) membrane, which after long usage can deteriorate microphone sensitivity.

In an embodiment, a short tube boom headset can solve these problems by shortening the boom, moving the ECM away from the user's mouth and using a rubber boot to extend the acoustic port of the noise-canceling microphone. This can extend the effective close-talk range of the ECM. This maintains the noise-canceling ECM property for far away noises. In addition, the boom tube can be lined with wind-screen form material. This solution further allows the headset computer to be suitable for enterprise call center, industrial, and general mobile usage. In an embodiment with identical dual-microphones within the tube boom, the respective rubber boots of each microphone can also be identical.

In an embodiment, the short tube boom headset can be a wired or wireless headset. The headset includes the short microphone (e.g., and ECM) tube boom. The tube boom can extend from the housing of the headset along the user's cheek, where the tube boom is either straight or curved. The tube boom can extend the length of the cheek to the side of the user's mouth, for instance. The tube boom can include a single noise-cancelling microphone on its inside.

The tube boom can further include a dual microphone inside of the tube. A dual microphone can be more effective in cancelling out non-stationary noise, human noise, music, and high frequency noises. A dual microphone can be more suitable for mobile communication, speech recognition, or a Bluetooth headset. The two microphones can be identical, however a person of ordinary skill in the art can also design a tube boom having microphones of different models.

In an embodiment having dual-microphones, the two microphones enclosed in their respective rubber boats are placed in series along the inside of the tube.

The tube can have a cylindrical shape, although other shapes are possible (e.g., a rectangular prism, etc.). The short tube boom can have two openings, one at the tip, and a second at the back. The tube surface can be covered with a pattern of one or more holes or slits to allow sound to reach the microphone inside the tube boom. In another embodiment, the short tube boom can have three openings, one at the tip, another in the middle, and another in the back. The openings can be equally spaced, however, other a person of ordinary skill in the art can design other spacings.

The microphone in the tube boom is a bi-directional noise-cancelling microphone having pressure-gradient microphone elements. The microphone can be enclosed in a rubber boot extending acoustic port on the front and the back side of the microphone with acoustic ducts. Inside of the boot, the microphone element is sealed in the air-tight rubber boot.

Within the tube, the microphone with the rubber boot is placed along the inside of the tube. An acoustic port at the tube tip aligns with the boom opening, and an acoustic port at the tube back aligns with boom opening. The rubber boot can be offset from the tube ends to allow for spacing between the tube ends and the rubber boot. The spacing further allows breathing room and for room to place a wind-screen of appropriate thickness. The rubber boot and inner wall of the tube remain air-tight, however. A wind-screen foam material (e.g., wind guard sleeves over the rubber boot) fills the air-duct and the open space between acoustic port and tube interior/opening.

FIG. 1 is a block diagram 100 illustrating an example embodiment of a noise cancellation circuit of the present invention.

Signals 110 and 112 from two microphones are digitized and fed into the noise cancelling circuit 101. The noise cancelling circuit 101 can be a digital signal processing (DSP) unit (e.g., software executing on a processor, hardware block, or multiple hardware blocks). In an embodiment, the noise cancellation circuit 101 can be a digital signal processing (DSP) chip, a system-on-a-chip (SOC), a Bluetooth chip, a voice CODEC with DSP chip, etc. The noise cancellation circuit 101 can be located in a Bluetooth headset near the user's ear, in an inline control case with battery, or inside the connector, etc. The noise cancellation circuit 101 can be powered by a battery or by a power source of the device that the headset is connected to, such as the device's batter, or power from a USB, micro-USB, or Lightening connector.

The noise cancellation circuit 101 includes four functional blocks: a beam-forming (BF) module 102, a Desired Voice Activity Detection (VAD) Module 108, an adaptive noise cancellation (ANC) module 104 and a single signal noise reduction (NR) module 106. The two signals 110 and 112 are fed into the BF module 102, which generates a main signal 130 and a reference signal 132 to the ANC module 104. A closer (i.e., relatively close to the desired sound) microphone signal 110 is collected from a microphone closer to the user's mouth and a further (i.e., relatively distant to the desired sound) microphone signal is collected from a microphone further from the user's mouth, relatively. The BF module 102 also generates a main signal 120 and reference signal 122 for the desired VAD module 108. The main signal 120 and reference signal 122 can, in certain embodiments, be different from the main signal 130 and reference signal 132 generated for the for ANC module 104.

The ANC module 104 processes the main signal 130 and the reference signal 132 to cancel out noises from the two signals and output a noise cancelled signal 142 to the single channel NR module 106. The single signal NR module 106 post-processes the noise cancelled signal 142 from the ANC module 104 to remove any further residue noises. Meanwhile, the VAD module 108 derives, from the main signal 120 and reference signal 122, a desired voice activity detection (DVAD) signal 140 that indicates the presence or absence of speech in the main signal 120 and reference signal 122. The DVAD signal 140 can then be used to control the ANC module 104 and the NR module 106 from the result of BF module 102. The DVAD signal 140 indicates to the ANC module 104 and the Single Channel NR module 106 which sections of the signal have voice data to analyze, which can increase the efficiency of processing of the ANC module 104 and single channel NR module 106 by ignoring sections of the signal without voice data. Desired speech signal 144 is generated by single channel NR module 106.

In an embodiment, the BF module 102, ANC module 104, single NR reduction module 106, and desired VAD module 108 employ linear processing (e.g., linear filters). A linear system (which employs linear processing) satisfies the properties of superposition and scaling or homogeneity. The property of superposition means that the output of the system is directly proportional to the input. For example, a function F(x) is a linear system if:

$$F(x_1 + x_2 + \hat{a}\in\,) = F(x_1) + F(x_2) + \hat{a}\in\,$$

A satisfies the property of scaling or homogeneity of degree one if the output scales proportional to the input. For example, a function F(x) satisfies the properties of scaling or homogeneity if, for a scalar $\hat{1}\pm$:

$$F(\hat{1}\pm x) = \hat{1}\pm F(x)$$

In contract, a non-linear function does not satisfy both of these conditions.

Prior noise cancellation systems employ non-linear processing. By using linear processing, increasing the input changes the output proportionally. However, in non-linear processing, increasing the input changes the output non-proportionally. Using linear processing provides an advantage for speech recognition by improving feature extraction. Speaker recognition algorithm is developed based on noiseless voice recorded in quiet environment with no distortion. A linear noise cancellation algorithm does not introduce nonlinear distortion to noise cancelled speech. Speech recognition can deal with linear distortion on speech, but not non-linear distortion of speech. Linear noise cancellation algorithm is "transparent" to the speech recognition engine. Training speech recognition on the variations of nonlinear distorted noise is impossible. Non-linear distortion can disrupt the feature extraction necessary for speech recognition.

An example of a linear system is a Weiner Filter, which is a linear single channel noise removal filter. The Wiener filter is a filter used to produce an estimate of a desired or target random process by linear time-invariant filtering an observed noisy process, assuming known stationary signal, noise spectra, and additive noise. The Wiener filter minimizes the mean square error between the estimated random process and the desired process.

Figure 2:
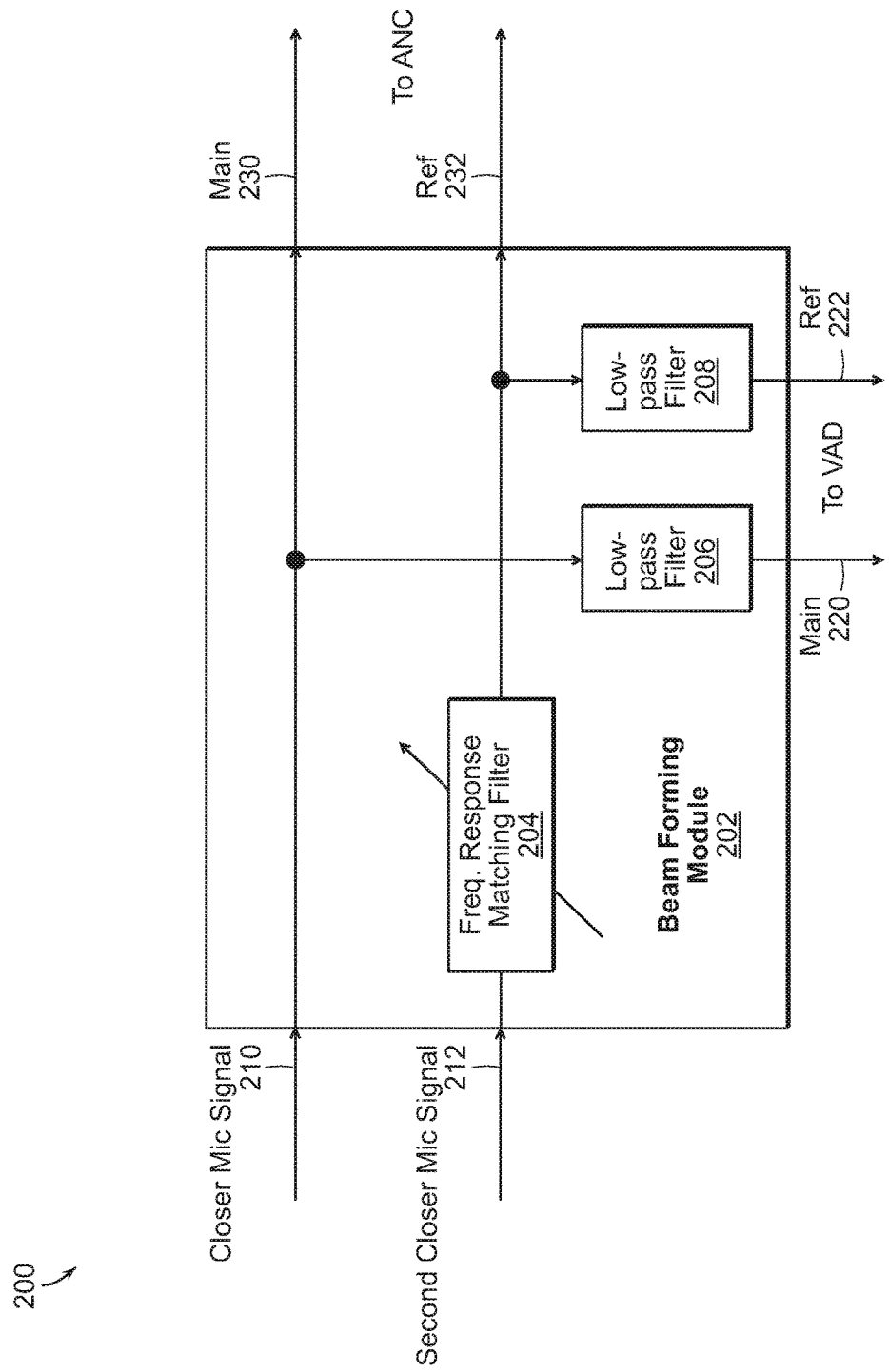
FIG. 2 is a block diagram illustrating an example embodiment of a beam-forming module of the invention that can be employed in the noise cancelling circuit.

FIG. 2 is a block diagram 200 illustrating an example embodiment of a beam-forming module 202 that can be employed in the noise cancelling circuit 101. The BF module 202 receives the closer microphone signal 210 and further microphone signal 212.

A further microphone signal 212 is inputted to a frequency response matching filter 204. The frequency response matching filter 204 adjusts gain, phase, and shapes the frequency response of the further microphone signal 212. For example, the frequency response matching filter 204 can adjust the signal for the distance between the two microphones, such that an outputted reference signal 232 representative of the further microphone signal 212 can be processed with the main signal 230, representative of the closer microphone signal 210. The main signal 230 and reference signal 232 are sent to the ANC module.

A closer microphone signal 210 is outputted to the ANC module as a main signal 230. The closer microphone signal 210 is also inputted to a low-pass filter 206. The reference signal 232 is inputted to a low-pass filter 208 to create a reference signal 222 sent to the Desired VAD module. The low-pass filters 206 and 208 adjust the signal for a "close talk case" by, for example, having a gradual low off from 2 kHz to 4 kHz, in one embodiment. Other frequencies can be used for different designs and distances of the microphones to the user's mouth, however.

Figure 3:
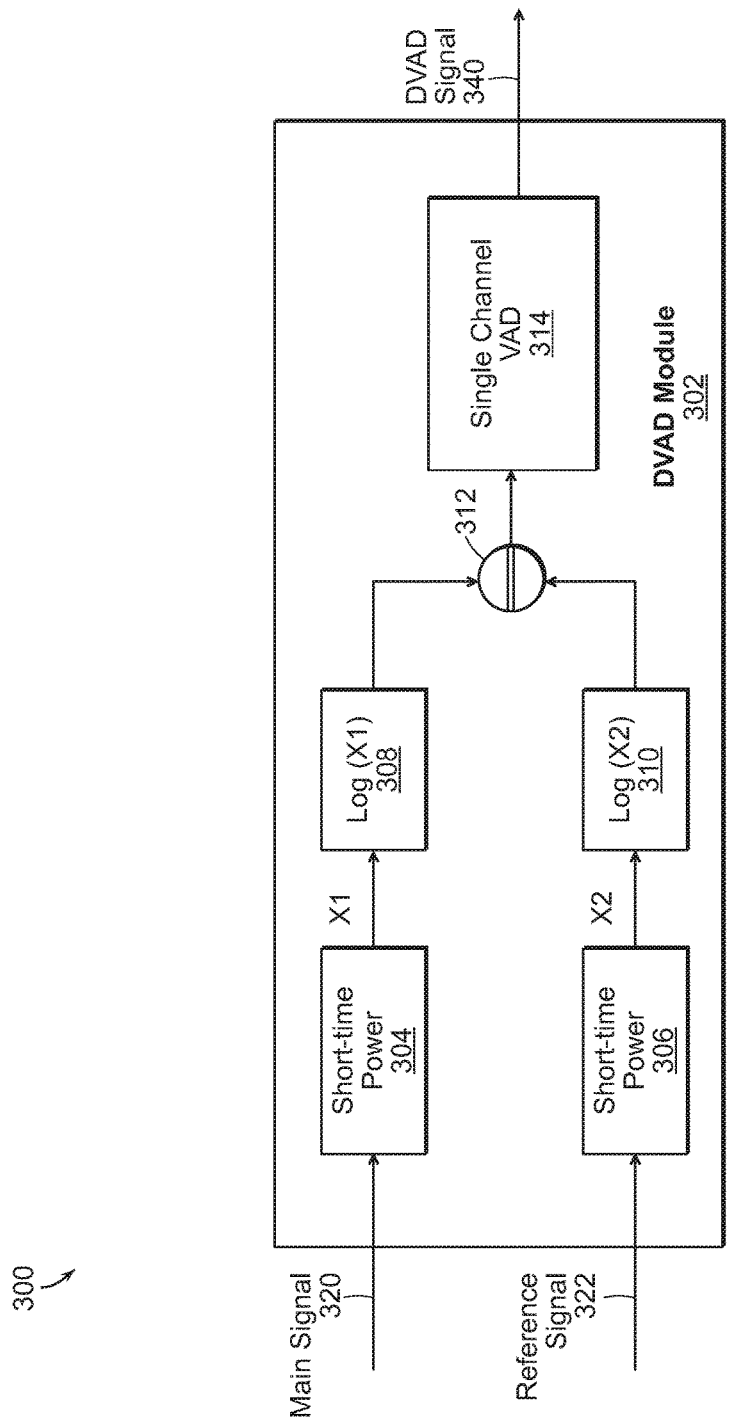
FIG. 3 is a block diagram illustrating an example embodiment of a Desired Voice Activity Detection Module of the invention.

FIG. 3 is a block diagram illustrating an example embodiment of a Desired Voice Activity Detection Module 302. The DVAD module 302 receives a main signal 320 and a reference signal 322 from the beam-forming module. The main signal 320 and reference signal 322 are processed by respective short-time power modules 304 and 306. The short-time power modules 304 and 306 can include a root mean square (RMS) detector, a power (PWR) detector, or an energy detector. The short-time power modules 304 and 306 output signals to respective amplifiers 308 and 310. The amplifiers can be logarithmic converters (or log/logarithmic amplifiers). The logarithmic converters 308 and 310 output to a combiner 312. The combiner 312 is configured to combine signals, such as the main signal and one of the at least one reference signals, to produce a voice activity difference signal by subtracting the detection(s) of the reference signal from the main signal (or vice-versa). The voice activity difference signal is inputted into a single channel VAD module 314. The single channel VAD module can be a conventional VAD module. The single channel VAD 314 outputs the desired voice activity signal.

Figure 4:
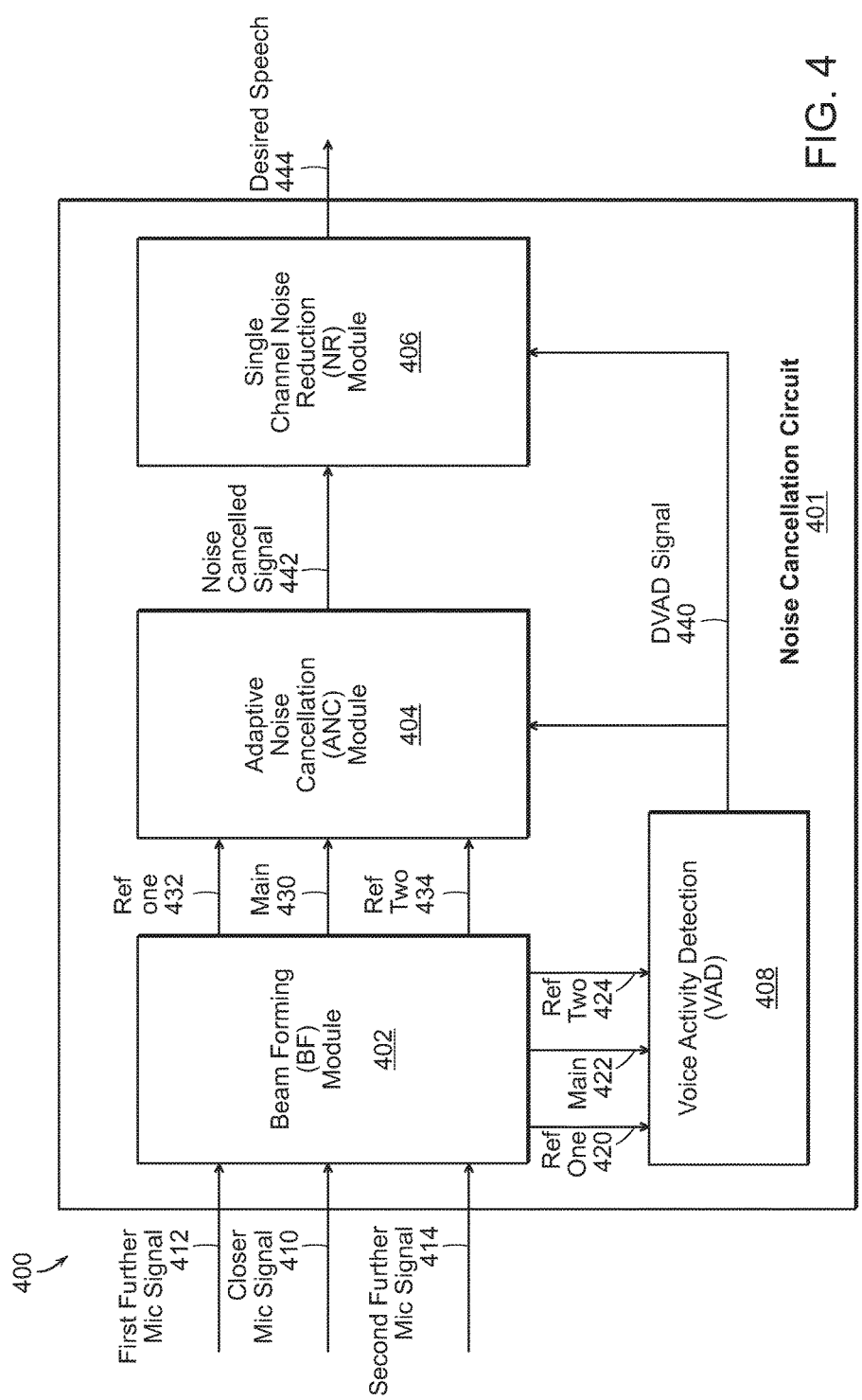
FIG. 4 is a block diagram illustrating an example embodiment of a noise cancellation circuit of the invention employed to receive a closer microphone signal and a first and second further microphone signal respectively.

FIG. 4 is a block diagram 400 illustrating an example embodiment of a noise cancellation circuit 401 employed to receive a closer microphone signal 410 and a first and second further microphone signal 412 and 414, respectively. The noise cancellation circuit 401 is similar to the noise cancellation circuit 101 described in relation to FIG. 1, however, the noise cancellation circuit 401 is employed to receive three signals instead of two. A beam-forming (BF) module 402 is arranged to receive the signals 410, 412 and 414 and output a main signal 430, a first reference signal 432 and second reference signal 434 to an adaptive noise cancellation module 404. The beam-forming module is further configured to output a main signal 422, first reference signal 420 and second reference signal 424 to a voice activity detection (VAD) module 408.

The ANC module 404 produces a noise cancelled signal 442 to a Single Channel Noise Reduction (NR) module 406, similar to the ANC module 104 of FIG. 1. The single NR module 406 then outputs desired speech 444. The VAD module 408 outputs the DVAD signal to the ANC module 404 and the single channel NR module 406.

Figure 5:
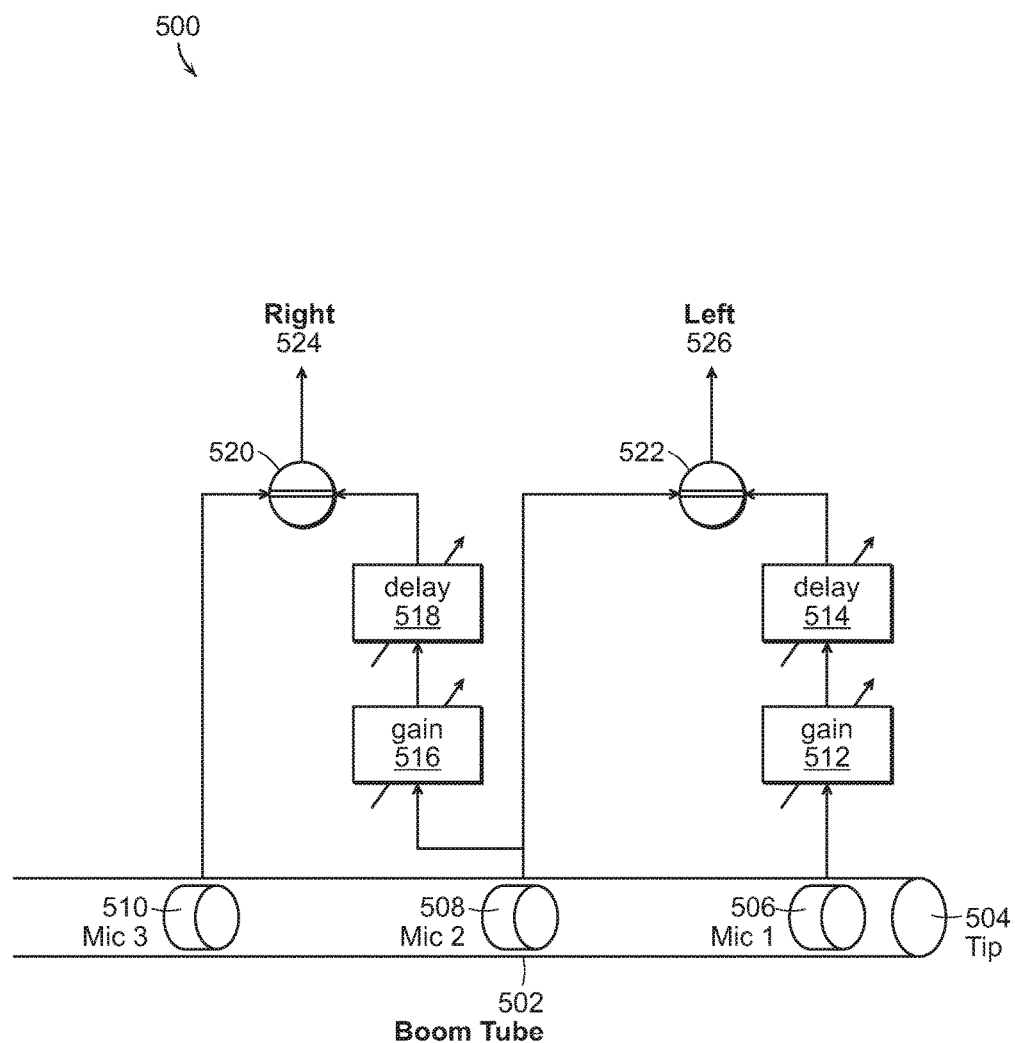
FIG. 5 is an embodiment of a boom tube housing three microphones in an arrangement of one embodiment of the invention.

FIG. 5 is an example embodiment of beam-forming from a boom tube 502 housing three microphones 506, 508, and 510. A first microphone 506 is arranged closest to a tip 504 of the boom tube 502, a second microphone 508 is arranged in the boom tube 502 further away from the tip 504, and a third microphone 510 is arranged in the boom tube 502 even further away from the tip 504. The first microphone 506 and second microphone 508 are arranged to provide data to output a left signal 526. The first microphone is arranged to output its signal to a gain module 512 and a delay module 514, which is outputted to a combiner 522. The second microphone is connected directly to the combiner 522. The combiner 522 subtracts the two provided signals to cancel noise, which creates the left signal 526.

Likewise, the second microphone 508 is connected to a gain module 516 and a delay module 518, which is outputted to a combiner 520. The third microphone 510 is connected directly to the combiner 520. The combiner 520 subtracts the two provided signals to cancel noise, which creates the right signal 520.

Figure 6:
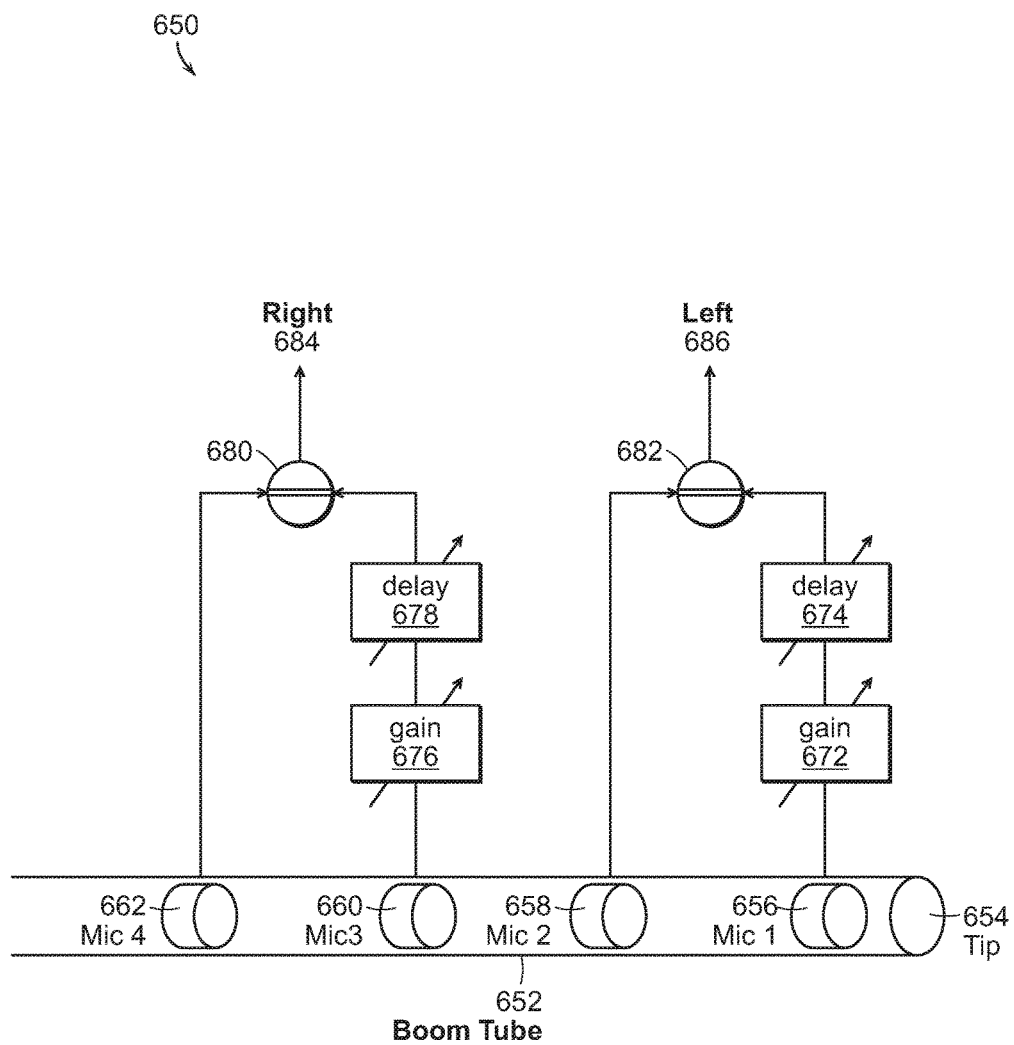
FIG. 6 is an embodiment of a boom tube housing four microphones in an arrangement of one embodiment of the invention

FIG. 6 is an example embodiment of beam-forming from a boom tube 652 housing four microphones 656, 658, 660 and 662. A first microphone 656 is arranged closest to a tip 654 of the boom tube 652, a second microphone 658 is arranged in the boom tube 652 further away from the tip 654, a third microphone 660 is arranged in the boom tube 652 even further away from the tip 654, and a fourth microphone 662 is arranged in the boom tube 652 away from the tip 654. The first microphone 656 and second microphone 658 are arranged to provide data to output a left signal 686. The first microphone is arranged to output its signal to a gain module 672 and a delay module 674, which is outputted to a combiner 682. The second microphone is connected directly to the combiner 658. The combiner 682 subtracts the two provided signals to cancel noise, which creates the left signal 686.

Likewise, the third microphone 660 is connected to a gain module 676 and a delay module 678, which is outputted to a combiner 680. The fourth microphone 662 is connected directly to the combiner 680. The combiner 680 subtracts the two provided signals to cancel noise, which creates the right signal 684.

Figure 7:
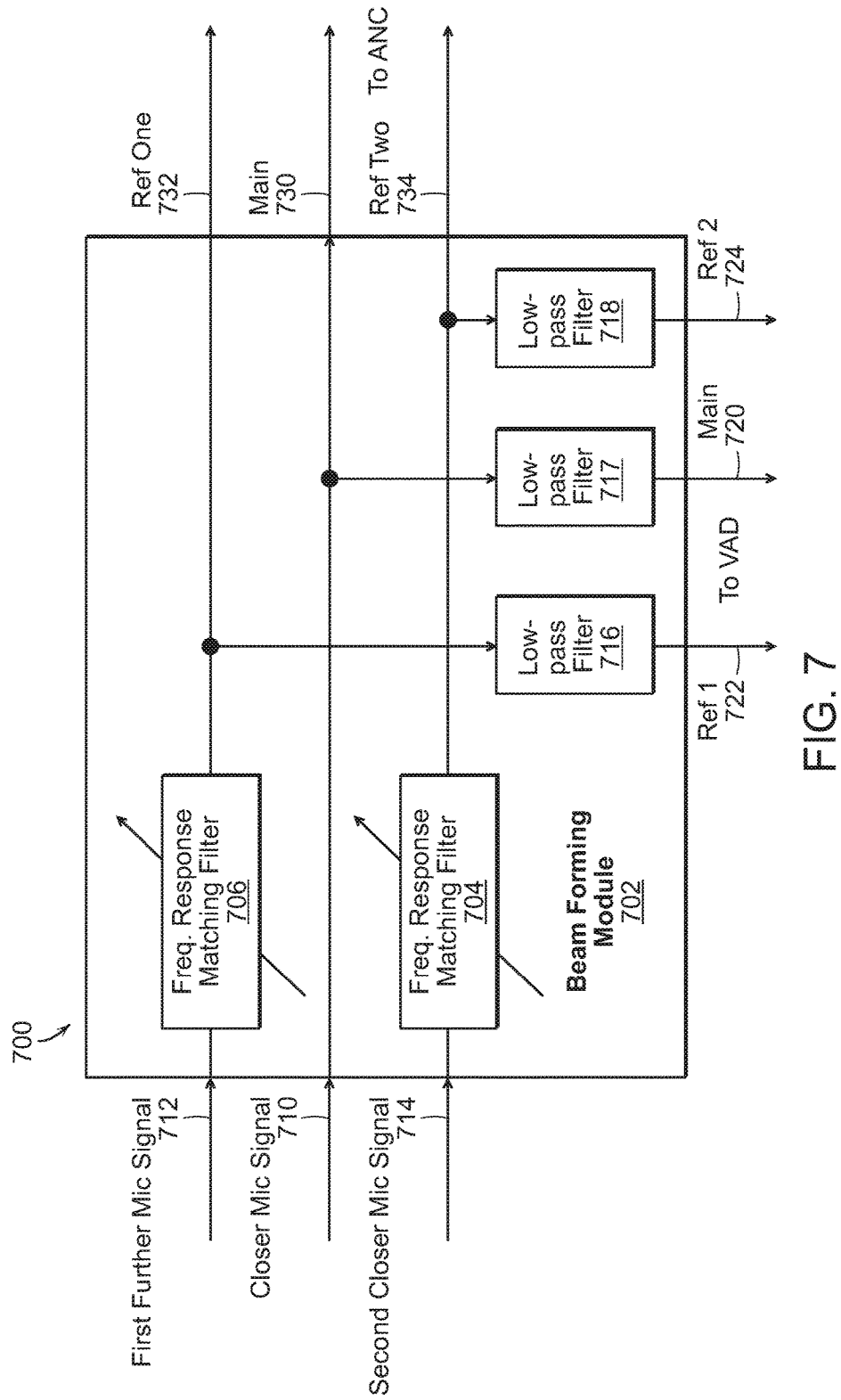
FIG. 7 is a block diagram illustrating an example embodiment of a beam-forming module accepting three signals of the invention.

FIG. 7 is a block diagram 700 illustrating an example embodiment of a beam-forming module 702 accepting three signals 710, 712 and 714. A closer microphone signal 710 is output as a main signal 730 to the ANC module and also inputted to a low-pass filter 717, to be outputted as a main signal 720 to the VAD module. A first further microphone signal 712 and second closer microphone signal 714 are inputted to respective frequency response matching filters 706 and 704, the outputs of which are outputted to be a first reference signal 732 and second reference signal 734 to the ANC module. The outputs of the frequency response matching filters 706 and 704 are also outputted to low-pass filters 716 and 718, respectively, which output a first reference signal 722 and second reference signal 724, respectively.

Figure 8:
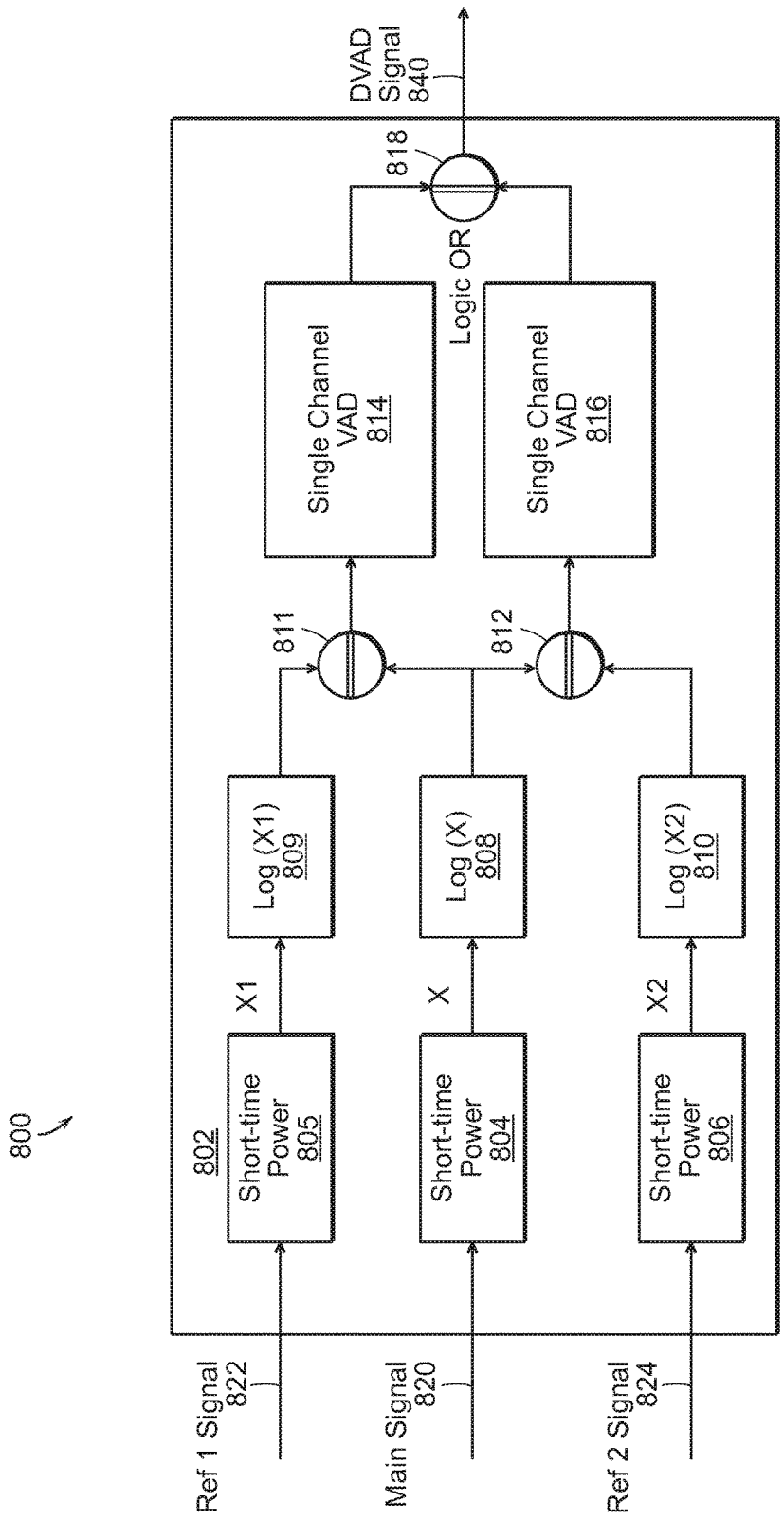
FIG. 8 is a block diagram illustrating an example embodiment of a desired voice activity detection (VAD) module accepting three signals of the invention.

FIG. 8 is a block diagram 800 illustrating an example embodiment of a desired voice activity detection (VAD) module 802 accepting three signals 820, 822 and 824. The VAD module 802 receives a main signal 820, a first reference signal 822 and a second reference signal 824 at short-time power modules 804, 805 and 806, respectively. The short-time power modules 804, 805, and 806 are similar to the short-time power modules described in relation to FIG. 3. The short-time power modules 804, 805, and 806 output to respective amplifiers 808, 809 and 810, which can each be a logarithmic converter. Amplifiers 808 and 809 output to a combiner module 811, which subtracts the two signals and outputs the difference to a single channel VAD module 814. Amplifiers 810 and 808 output to a combiner module 812, which subtracts the two signals and outputs the difference to a single channel VAD module 816. The single channel VAD modules 814 and 816 output to a logical OR-gate 818, which outputs a DVAD signal 840.

Figure 9:
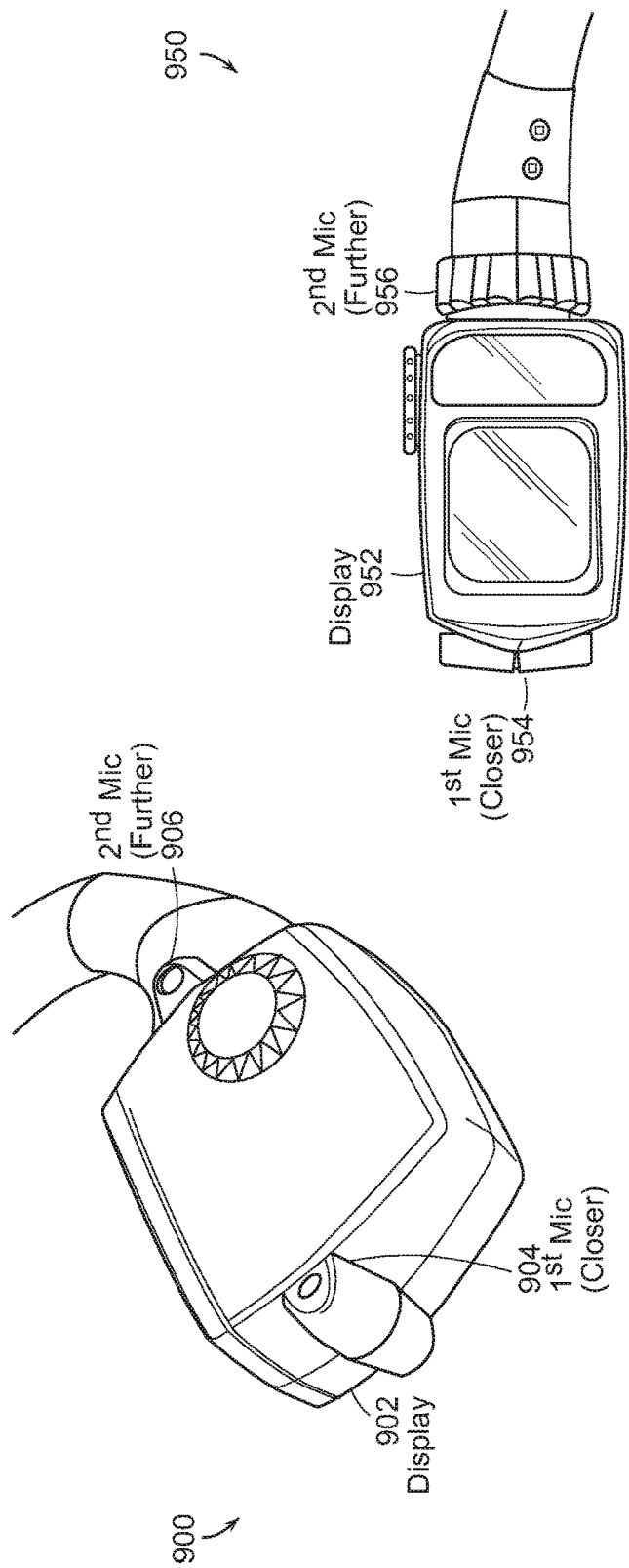
FIGS. 9A-B are diagrams illustrating an example embodiment of the invention including a display and first and second microphones.

FIG. 9A is a diagram 900 illustrating an example embodiment of a display 902 having a first microphone 902 and second microphone 904. The first microphone 902 is arranged to be closer to the user's mouth than the second microphone 904, which is further from the user's mouth. In an embodiment, the microphones 902 and 904 are arranged in cylindrical holes in the display's 902 housing.

FIG. 9B is a diagram 950 illustrating an example embodiment of a display 952 having a first microphone 952 and second microphone 954. The first microphone 902 is arranged to be closer to the user's mouth than the second microphone 954, which is further from the user's mouth. In an embodiment, the microphones 952 and 954 are arranged in cylindrical holes in the display's 952 housing.

Figure 10:
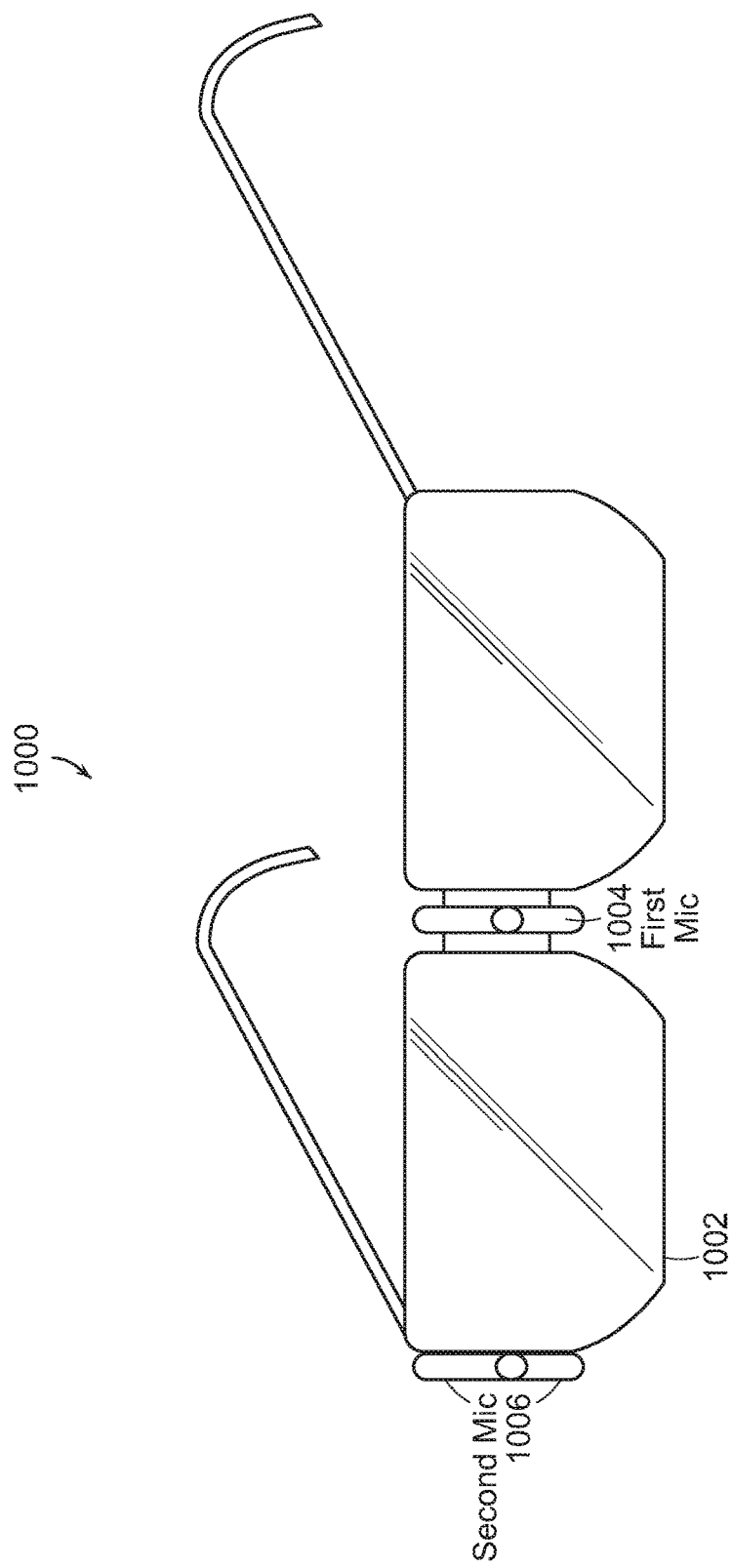
FIG. 10 is an illustration of an embodiment of eye-glasses of the invention having two embedded microphones.

FIG. 10 is a diagram 1000 illustrating an example embodiment of eye-glasses 1002 having embedded microphones. The eye-glasses 1002 have two microphones 1004 and 1006, a first microphone 1004 being arranged in the middle of the eye-glasses 1002 frame and a second microphone 1006 being arranged on the side of the eye-glasses 1002 frame. The microphones 1004 and 1006 can be pressure-gradient microphone elements, either bi- or uni-directional. Each microphone 1004 and 1006 is within a rubber boot. The rubber boot provides an acoustic port on the front and the back side of the microphone with acoustic ducts. The two microphones 1004 and 1006 and their respective boots can be identical. The microphone elements 1004 and 1006 can be sealed air-tight (e.g., hermetically sealed) inside the rubber boots. The acoustic ducts are filled with wind-screen material. The ports are sealed with woven fabric layers. The lower and upper acoustic ports are sealed with a water-proof membrane. The microphones can be built into the structure of the eye glasses frame. Each microphone has top and bottom holes, being acoustic ports. In an embodiment, the two microphones 1004 and 1006, which can be pressure-gradient microphone elements, can each be replaced by two omni-directional microphones.

Figure 11:
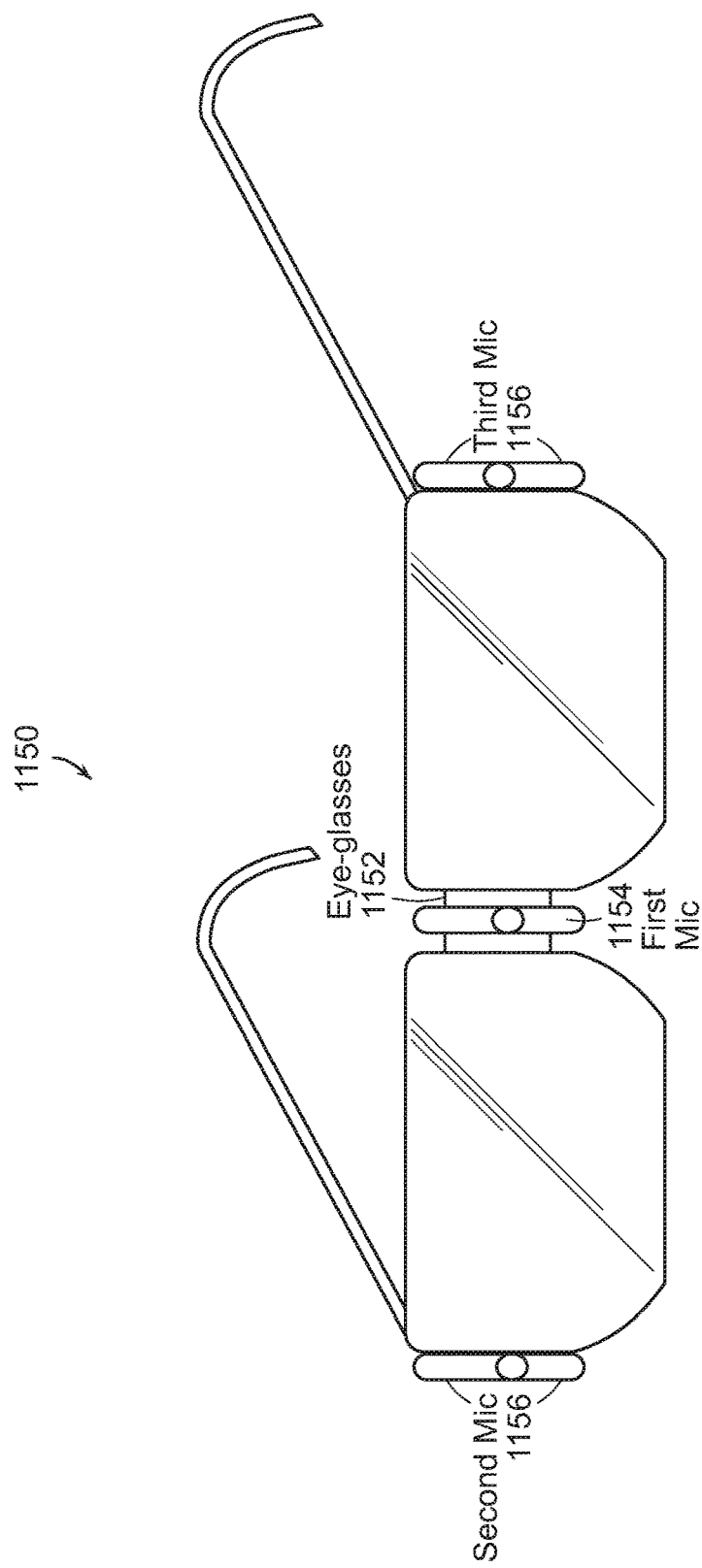
FIG. 11 is an illustration of an embodiment of eyeglasses of the invention having three embedded microphones.

FIG. 11 is a diagram 1150 illustrating an example embodiment of eye-glasses 1152 having three embedded microphones. The eye-glasses 1152 of FIG. 11 are similar to the eye-glasses 1002 of FIG. 10, but instead employ three microphones instead of two. The eye-glasses 1152 of FIG. 11 have a first microphone 1154 arranged in the middle of the eye-glasses 1152, a second microphone 1156 arranged on the left side of the eye-glasses 1152, and a third microphone 1158 arranged on the right side of the eye-glasses 1152. The three microphones can be employed in the three-microphone embodiment described above.

FIG. 12A is an exploded view of a microphone assembly 1200 of the invention. As shown therein, rubber boot 1202a-b is separated into a first half of the rubber boot 1202a and a second half of the rubber boot 1202b. Microphone 501 is between the rubber boot halves. Each rubber boot 1202a-b is lined by a wind-screen 1208 material, however FIG. 12A shows the wind-screen in the second half of the rubber boot 1202b. In the case of a pressure-gradient microphone, the air-duct and the open space between acoustic port and boom interior is filled with wind-screen foam material, such as wind guard sleeves over the rubber boots.

A microphone 1204 is arranged to be played between the two halves of the rubber boot 1202a-b. The microphone 1204 and rubber boot 1202a-b are sized such that the microphone 1204 fits in a cavity within the halves of the rubber boot 1202a-b. The microphone is coupled with a wire 1206, that extends out of the rubber boot 1202a-b and can be connected to, for instance, the noise cancellation circuit described above.

FIG. 12B is a perspective view of microphone assembly 1200 when assembled. The rubber boot 1252 of FIG. 12B is shown to have both halves 1202a-b joined together, where a microphone (not shown) is inside. A wire 1256 coupled to the microphone exist the rubber boot 1252 such that it can be connected to, for instance, the noise cancellation circuit described above.

Figure 13:
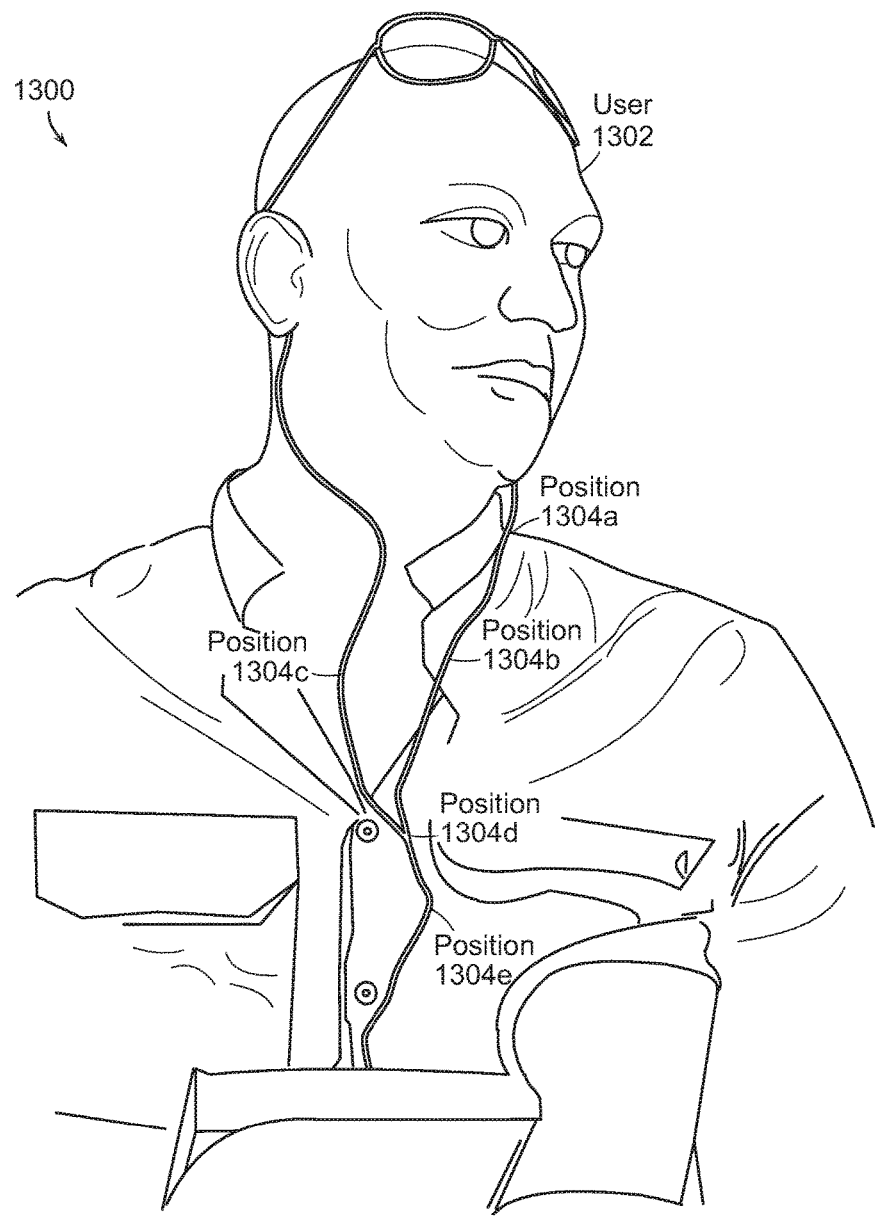
FIG. 13 is a diagram illustrating example positions of placements of the microphones of the invention.

FIG. 13 is an illustration of an embodiment of the invention 1300 showing various optional positions of placement of the microphones 1304a-e. As described above, the microphones are pressure-gradient. In an embodiment, microphones can be placed in any of the locations shown in FIG. 13, or any combination of the locations shown in FIG. 13. In a two-microphone system, the microphone closest to the user's mouth is referred to as MIC1, the microphone further from the user's mouth is referred to as MIC2. In an embodiment, both MIC1 & MIC2 can be inline at position 1 1304a. In other embodiments, the microphones can be positioned as follows:

MIC1 at position 1 1304a and MIC2 at position 2 1304b;
MIC1 at position 1 1304a and MIC2 at position 3 1304c;
MIC1 at position 1 1304a and MIC2 at position 4 1304d;
MIC1 at position 4 1304d and MIC2 at position 5 1304e;
Both MIC1 and MIC2 at position 4 1304d.

If position 4 1304d has a microphone, it is employed within a pendant.

The microphones can also be employed at other combinations of positions 1304a-e, or at positions not shown in FIG. 13.

Each pressure-gradient microphone element can be replaced with two omni-directional microphones at the location of each acoustic port, resulting in four total microphones. The signal from these two omni-directional microphone can be processed by electronic or digital beam-forming circuitry described above to produce a pressure gradient beam pattern. This pressure gradient beam pattern replaces the equivalent pressure-gradient microphone.

In an embodiment of the present invention, if a pressure-gradient microphone is employed, each microphone is within a rubber boot that extends an acoustic port on the front and the back side of the microphone with acoustic ducts. At the end of rubber boot, the new acoustic port is aligned with the opening in the tube, where empty space is filled with wind-screen material. If two omni-directional microphones are employed in place of one pressure-gradient microphone, then the acoustic port of each microphone is aligned with the opening.

In an embodiment, a long boom dual-microphone headset can look like a conventional close-talk boom microphone, but is a big boom with two-microphones in parallel. An end microphone of the boom is placed in front of user's mouth. The close-talk long boom dual-microphone design targets heavy noise usage in military, aviation, industrial and has unparalleled noise cancellation performance. For example, one main microphone can be positioned directly in front of mouth. A second microphone can be positioned at the side of the mouth. The two microphones can be identical with identical casing. The two microphones can be placed in parallel, perpendicular to the boom. Each microphone has front and back openings. DSP circuitry can be in the housing between the two microphones.

Microphone is housed in a rubber or silicon holder (e.g., the rubber boot) with an air duct extending to the acoustic ports as needed. The housing keeps the microphone in an air-tight container and provides shock absorption. The microphone front and back ports are covered with a wind-screen layer made of woven fabric layers to reduce wind noise or wind-screen foam material. The outlet holes on the microphone plastic housing can be covered with water-resistant thin film material or special water-resistant coating.

In another embodiment, a conference gooseneck microphone can provide noise cancellation. In large conference hall, echoes can be a problem for sound recording. Echoes recorded by a microphone can cause howling. Severe echo prevents the user from tuning up speaker volume and causes limited audibility. Conference hall and conference room can be decorated with expensive sound absorbing materials on their walls to reduce echo to achieve higher speaker volume and provide an even distribution of sound field across the entire audience. Electronic echo cancellation equipment is used to reduce echo and increase speaker volume, but such equipment is expensive, can be difficult to setup and often requires an acoustic expert.

In an embodiment, a dual-microphone noise cancellation conference microphone can provide an inexpensive, easy to implement solution to the problem of echo in a conference hall or conference room. The dual-microphone system described above can be placed in a desktop gooseneck microphone. Each microphone in the tube is a pressure-gradient bi-directional, uni-directional, or super-directional microphone.

Figure 14:
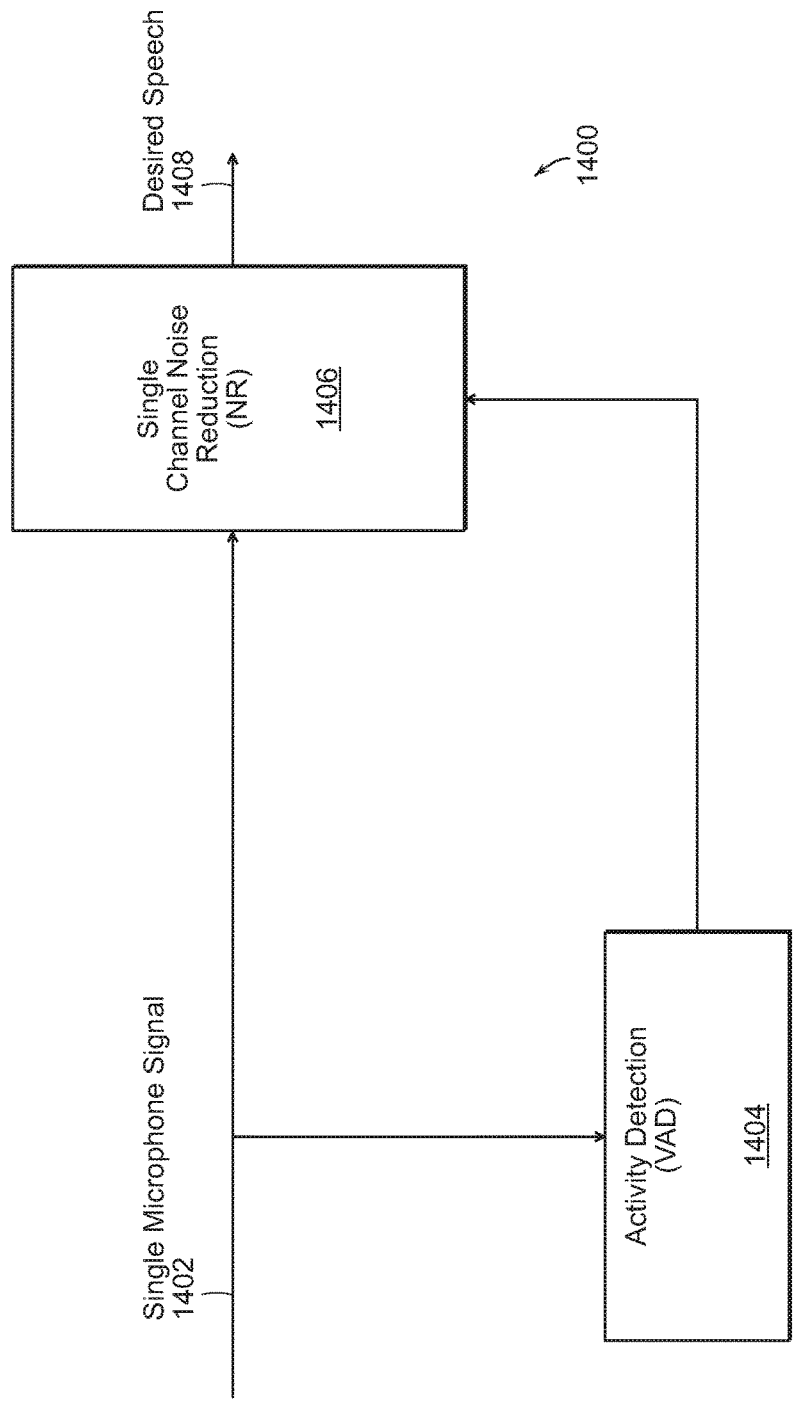
FIG. 14 is a block diagram illustrating an example embodiment of a noise cancellation circuit of the present invention employing a single microphone.

FIG. 14 is a block diagram 1400 illustrating an example embodiment of a noise cancellation circuit of the present invention employing a single microphone. A single microphone signal 1402 is received at an activity detection module (VAD) 1404 and a single channel noise reduction module (NR) 1406. The activity detection module (VAD) 1404 determines the signal microphone signal 1402 contains speech, and notifies the single channel noise reduction module (NR) 1406. The single channel noise reduction module (NR) 1406, responsive to the signal from the activity detection module (VD) 1404, reduces noise on the single microphone signal 1402 and outputs desired speech 1408.

FIG. 15 is a diagram 1500 of a headset 1502 having a dual-microphone 1503 attached. The dual-microphones 1503 are contained in a housing, but the individual microphones within the housing are shown by pictures of microphone 1504 and 1506.

Figure 16A:
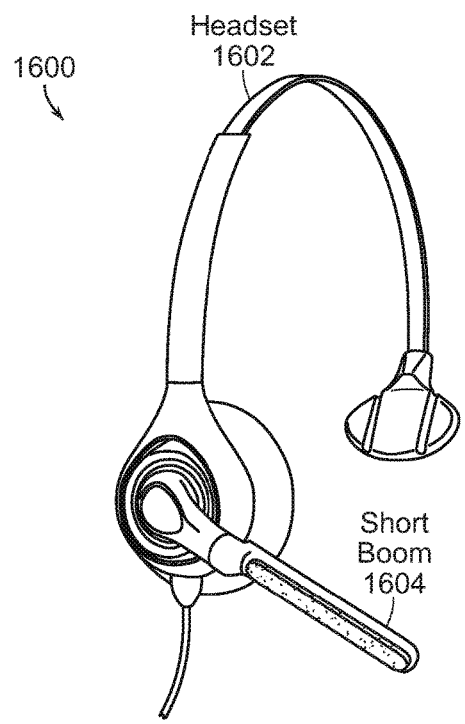
FIGS. 16A-B are diagrams illustrating example embodiments of a headset having a short boom.
Figure 16B:
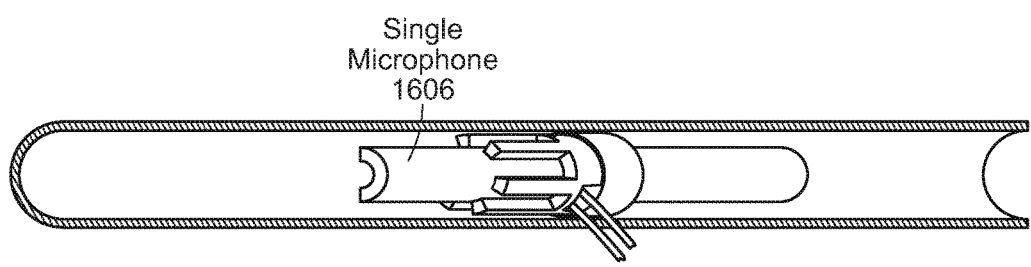

FIG. 16 is a diagram 1600 illustrating an example embodiment of a headset 1602 having a short boom 1604. The short boom 1604 houses a single microphone 1606 which is enclosed in a rubber boot, described herein above.

Figure 17A:
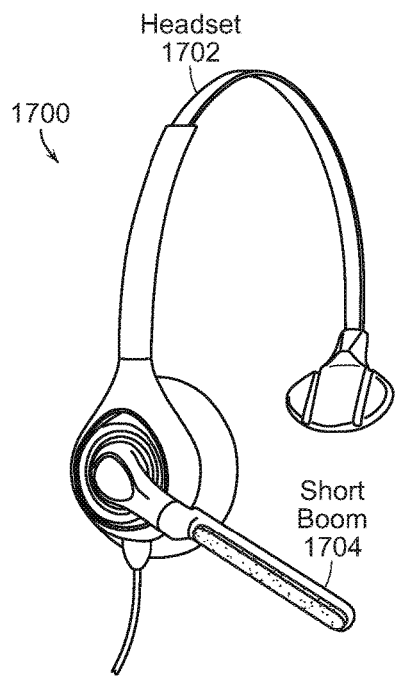
FIGS. 17A-B are diagrams illustrating example embodiments of a headset having a short boom.
Figure 17B:
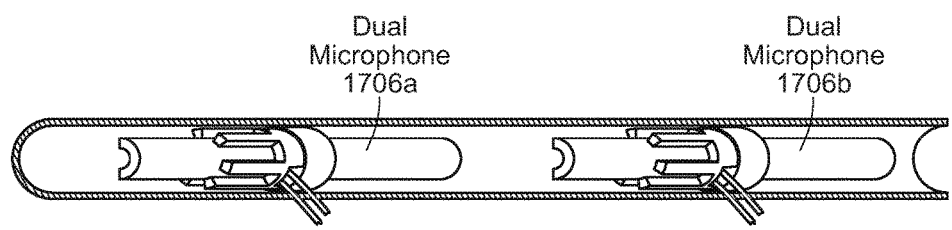

FIG. 17 is a diagram 1700 illustrating an example embodiment of a headset 1702 having a short boom 1704. The short boom 1704 houses dual microphones 1706, comprised of microphone 1706a and 1706b. Both microphones 1706a-b are enclosed in a rubber boot, described herein above.

Figure 18A:
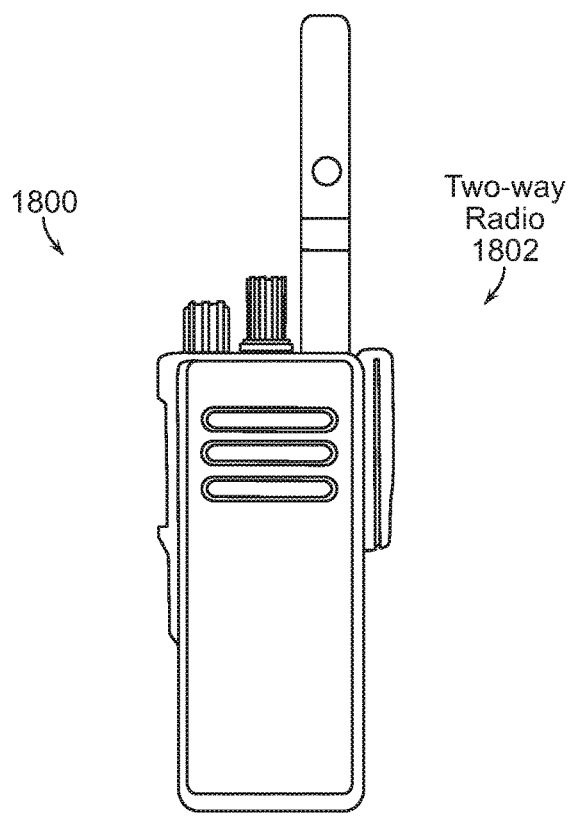
FIGS. 18A-B are diagrams illustrating example embodiments of two-way radios.
Figure 18B:
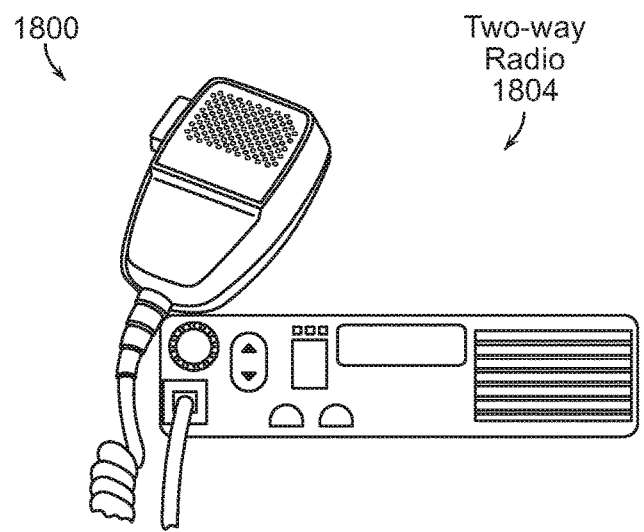

FIG. 18 is a diagram 1800 illustrating example embodiments of two-way radios 1802 and 1804. Two-way radios are widely used for public safety, enterprise and industrial applications, and consumer applications.

Figure 19:
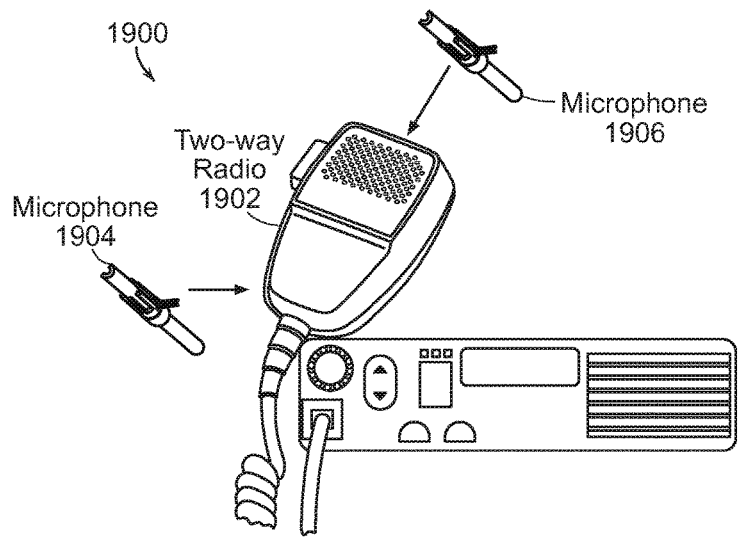
FIG. 19 is a diagram illustrating an example embodiment of a two-way radio.

FIG. 19 is a diagram 1900 illustrating an example embodiment of a two-way radio 1902. The two-way radio includes a microphone 1904 in a bottom portion of the two-way radio 1902 and a microphone 1906 in a top portion of the two-way radio 1902. Traditionally, a two-way radio only has a microphone in the top part of the device. In an embodiment of the present invention, a second microphone is employed at the bottom of the two-way radio 1902 to provide a main microphone at the top and a reference microphone at the bottom. The user employs a push-to-talk button or feature near the top of the device.

Figure 20:
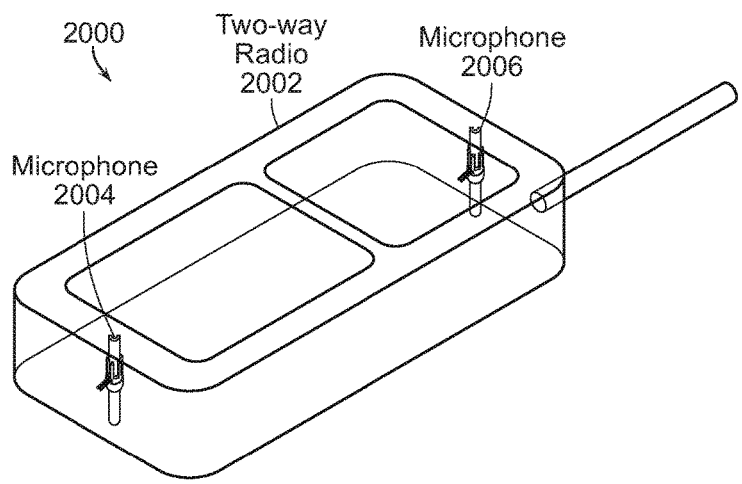
FIG. 20 is a diagram illustrating an example embodiment of a two-way radio having a microphone in a bottom portion of the device and a microphone in the top portion of the device.

FIG. 20 is a diagram 2000 illustrating an example embodiment of a two-way radio 2002 having a microphone 2004 in a bottom portion of the device and a microphone 2006 in the top portion of the device. The microphones 2004 and 2006 can be bi-directional microphones with an acoustic extension to the ports in the front and back case surface of the device.

Figure 21:
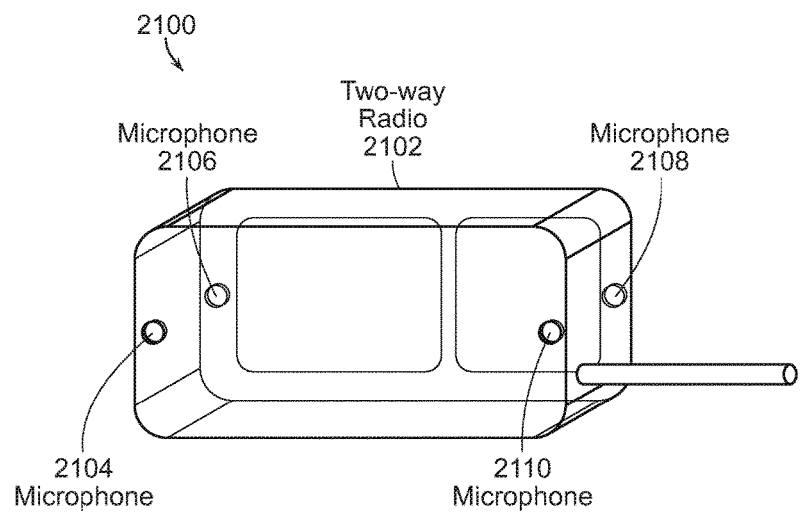
FIG. 21 is a diagram illustrating an example embodiment of a two-way radio having four microphones.

FIG. 21 is a diagram 2100 illustrating an example embodiment of a two-way radio 2100 having four microphones. The two-way radio 2102 has two microphones 2104 and 2106 in the bottom portion and two microphones 2108 and 2110 in the top portion. Each bi-directional microphone with an extension shown in previous embodiments can be replaced with two omni-directional microphones (e.g., microphones 2104 and 2106 and microphones 2108 and 2110) at each port. The four omni-directional microphone configuration can occupy less space and therefore fit into a smaller device. The omni-directional microphone can be a MEMS microphone. Four microphone is more flexible for speech recorded from further away. The two microphones of the top portion can electronically form a uni-directional beam for far field talk or video recording.

Figure 22:
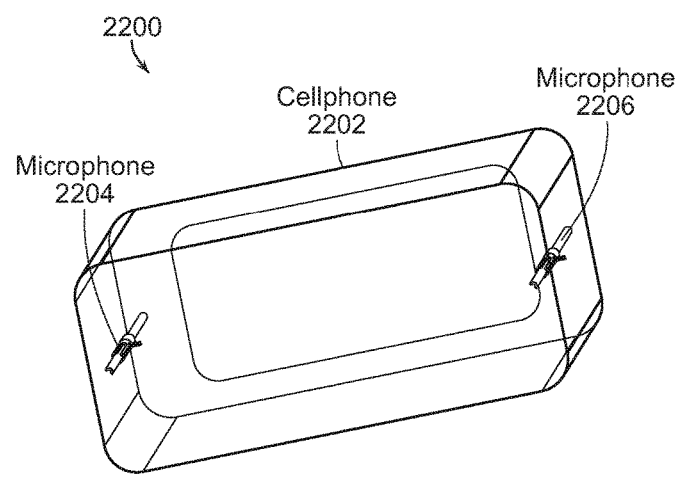
FIG. 22 is a diagram of a cellphone includes microphones.

FIG. 22 is a diagram 2200 of a cellphone 2202 includes microphones 2204 and 2206. Handheld smartphones traditionally have a microphone on the bottom part of the phone. The user talks closely to the bottom part of the device while holding it. The same bi-directional microphone with an acoustic extension to the ports can be in the front and back case surface of the device. The main microphone can be in the bottom portion of the cell phone 2202 and reference microphone can be at the top portion.

Figure 23:
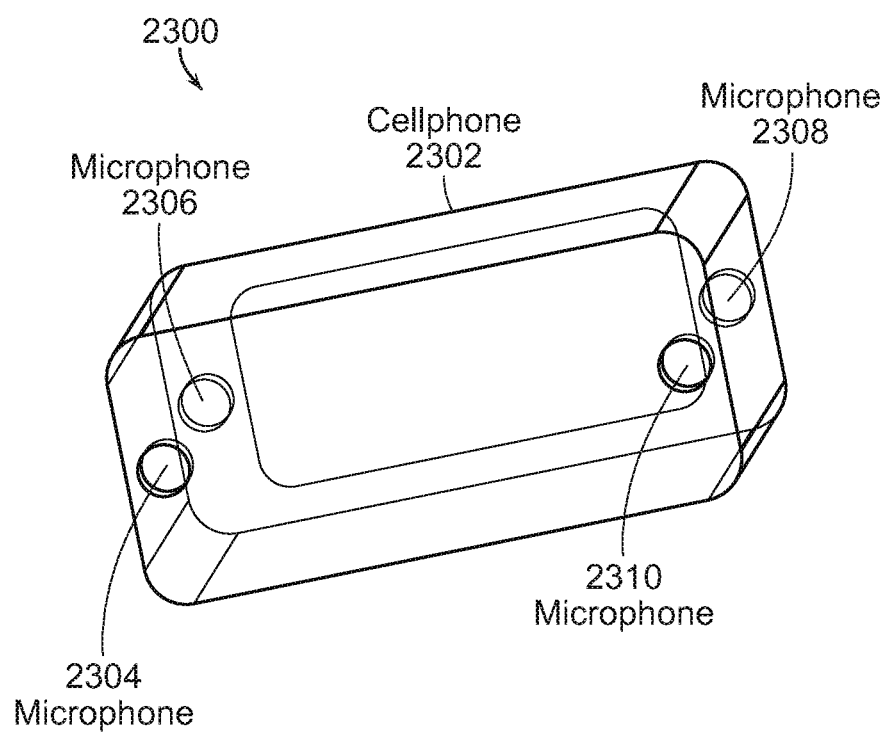
FIG. 23 is a diagram illustrating an example embodiment of a cell phone 2302 having four microphones.

FIG. 23 is a diagram 2300 illustrating an example embodiment of a cell phone 2302 having four microphones. Each bi-directional microphone with extension can be replaced with two omni-directional microphones at each port location. The four omni-directional microphone configuration can fit into a smaller device and therefore occupy less space. The omni-directional microphone can be a MEMS microphone. Four-microphones can be more flexible for a far talk scenario. Upper two microphones can electronically form a uni-directional beam for far field talk or video recording.

The relevant teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A noise cancelling digital signal processor (DSP), comprising:
   a) a beam-forming module configured to output a main signal and one or more reference signals based on audio signals received from at least two microphones, wherein the beam-forming module includes one or more de-emphasis filters, each of which comprises at least one of a low-pass filter and a frequency response matching filter, each of the one or more de-emphasis filters arranged to filter at least one of the main and reference signals;
   b) a voice activity detection module configured to receive the main signal and reference signals and to output a desired voice activity signal, and whereby a first one of the one or more de-emphasis filters is arranged to filter the main signal, and a second one of the one or more de-emphasis filters is arranged to filter the reference signal, prior to reception of the main signal and the reference signal by the voice activity detection module;
   c) an adaptive noise cancellation module configured to receive the main signal, reference signals and desired voice activity signal and output an adaptive noise cancelled signal; and
   d) a single channel noise reduction module configured to receive the desired voice activity signal and adaptive noise cancellation signal and output a desired speech signal.

2. The noise cancelling DSP of claim 1, wherein the desired voice activity signal is further configured to control the adaptive noise cancellation module and the noise reduction module.

3. The noise cancelling DSP of claim 1, wherein the voice activity detection module further includes:
   a) one or more short-time detectors, configured to detect a short-time power of each of the received main and reference signals, respectively;
   b) one or more log scalers, configured to convert the detected short-time power of each short-time detector, respectively; and
   c) one or more combiners, configured to receive the log scaled short-time power detections of the main signal and one of the reference signals and produce a voice activity difference signal based on said detections.

4. The noise cancelling DSP of claim 3, wherein the voice activity difference signal is further communicatively coupled to a signal channel voice activity detection module outputting the desired voice activity signal.

5. The noise cancelling DSP of claim 4, wherein the voice activity detection module further includes an OR-gate or an AND-gate, based on microphone configuration, arranged to receive multiple desired voice activity signals and output one of the multiple desired voice activity signals.

6. The noise cancelling DSP of claim 3, wherein the short-time detector is a root-mean-square detector, power detector, or energy detector.

7. The noise cancelling DSP of claim 1, wherein the low-pass filter adjusts at least one of the main signal and the reference signal to accommodate a close talk range of the at least two microphones.

8. The noise cancelling DSP of claim 7, wherein the de-emphasis filter has a gradual slope roll-off starting at a frequency approximately between 1 kHz and 4 kHz and continuing to approximately a Nyquist frequency.

\* \* \* \* \*